US012780706B2

(12) United States Patent
Featherstone et al.

(10) Patent No.: US 12,780,706 B2
(45) Date of Patent: Nov. 3, 2026

(54) PROCESS FOR PRODUCING ENHANCED MANGANESE-ZINC GEOTHERMAL FILTER CAKE COMPOSITIONS

(71) Applicant: ENERGYSOURCE MINERALS, LLC, Carlsbad, CA (US)

(72) Inventors: John L. Featherstone, El Centro, CA (US); Christian J. Calvert, El Centro, CA (US)

(73) Assignee: ENERGYSOURCE MINERALS, LLC, Carlsbad, CA (US)

( * ) Notice: Subject to any disclaimer, the term of this patent is extended or adjusted under 35 U.S.C. 154(b) by 0 days.

(21) Appl. No.: 19/088,985

(22) Filed: Mar. 24, 2025

(65) Prior Publication Data

US 2025/0389001 A1 Dec. 25, 2025

Related U.S. Application Data

(60) Provisional application No. 63/569,202, filed on Mar. 24, 2024.

(51) Int. Cl.
*C02F 11/121* (2019.01)

(52) U.S. Cl.
CPC .................................. *C02F 11/121* (2013.01)

(58) Field of Classification Search
CPC .............. C04B 35/62655; C04B 35/01; C04B 35/62675; C04B 2235/3262;
(Continued)

(56) References Cited

U.S. PATENT DOCUMENTS 9,580,770 B2 2/2017 Bhaduri et al.
10,017,837 B2 7/2018 Bhaduri et al.
(Continued)

FOREIGN PATENT DOCUMENTS

EP 4491589 A1 1/2025

OTHER PUBLICATIONS

Perkins, E.C., "Caustic Leaching of Manganese Flotation Concentrate from Artillery Peak, Ariz", United States Department of the Interior, Jun. 1957, total 24 pages. (Year: 1957).*
(Continued)

*Primary Examiner* — Richard M Rump
*Assistant Examiner* — Abdul-Rahman Yusuf Waleed Smari
(74) *Attorney, Agent, or Firm* — Crowe & Dunlevy, P.C.

(57) ABSTRACT

This invention relates generally to a process for producing enhanced manganese-zinc geothermal filter cake compositions. After precipitation of zinc and manganese from a geothermal brine, the process repulps and washes a mixed polymetallic oxide/hydroxide/oxychloride geothermal filter cake with a repulp and/or a wash liquor to produce an enhanced, slurried manganese-zinc geothermal filter cake composition. The process can further include dewatering the slurried manganese-zinc geothermal filter cake composition to produce an enhanced, dewatered manganese-zinc geothermal filter cake composition, and the process can further include drying the dewatered manganese-zinc geothermal filter cake composition to produce an enhanced, dried manganese-zinc geothermal filter cake composition. The enhanced manganese-zinc geothermal filter cake compositions have enhanced concentrations of zinc and manganese and reduced concentrations of chloride and other salts. The enhanced manganese-zinc geothermal filter cake compositions can be processed to extract manganese and zinc therefrom.

35 Claims, 6 Drawing Sheets

(58) Field of Classification Search
CPC ...... C04B 2235/3284; C04B 2235/444; C04B 2235/606; B01D 29/78; B01D 29/84; C22B 3/02; C02F 11/121
See application file for complete search history.

(56) References Cited

U.S. PATENT DOCUMENTS

| | | | | |
|---|---|---|---|---|
| 2016/0289792 | A1 | 10/2016 | Bhaduri et al. | |
| 2020/0189925 | A1 | 6/2020 | Featherstone et al. | |
| 2023/0064968 | A1* | 3/2023 | Smith | C22B 3/44 |

OTHER PUBLICATIONS

Svarovsky, L., "Solid-Liquid Separation", 2001, Butterworth-Heinemann, Fourth Edition, pp. 335-348, 442-475. (Year: 2001).*
Kinnarinen Teemu et al: "Removal of chloride from fly ash produced in hazardous waste incineration by leaching and displacement washing in a vertical filter press", Waste Management and Research, vol. 31, No. 2, Jan. 11, 2013 (Jan. 11, 2013), pp. 178-186.
Skrzekut Tomasz et al: "Studies of Selective Recovery of Zinc and Manganese from Alkaline Batteries Scrap by Leaching and Precipitation", Materials, vol. 15, No. 11, Jun. 2, 2022 (Jun. 2, 2022), p. 3966.
Warren Ian: "Techno-Economic Analysis of Lithium Extraction from Geothermal Brines", May 31, 2021 (May 31, 2021), pp. 1-48.
Extended European Search Report for European Patent Application No. 251937363, dated Feb. 27, 2026, 12 pages.
Non-Final Office Action for United States U.S. Appl. No. 19/354,367, dated Apr. 3, 2026, 15 pages.

* cited by examiner

PROCESS FOR PRODUCING ENHANCED MANGANESE-ZINC GEOTHERMAL FILTER CAKE COMPOSITIONS

CROSS-REFERENCE TO RELATED APPLICATIONS

This application claims the benefit of U.S. Provisional Patent Application No. 63/569,202 filed Mar. 24, 2024, and said provisional application is incorporated by reference in its entirety into this document as if fully set out at this point.

BACKGROUND OF THE INVENTION

1. Field of the Invention

The subject matter disclosed herein relates to a process for producing enhanced manganese-zinc geothermal filter cake compositions and, more particularly, a process for repulping and washing mixed polymetallic oxide/hydroxide/oxychloride geothermal filter cakes after precipitation of zinc and manganese from a geothermal brine to produce enhanced geothermal filter cake compositions having increased concentrations of zinc and manganese and reduced concentrations of chloride and other salts. The enhanced geothermal filter cake compositions can be processed to extract zinc, manganese, or both.

2. Description of the Related Art

The Salton Sea Known Geothermal Resource Area ("SSKGRA") and the North Brawley Known Geothermal Resource Area ("NBKGRA") are located in the Salton Trough, a major trans-tensional rift between the Pacific plate, on the west, and the North American plate, on the east, which merges southward through Mexico into the long, narrow Gulf of California. The SSKGRA has the most geothermal capacity potential in the United States. Geothermal energy, the harnessing of heat radiating from the Earth's crust, is a renewable resource capable of cost-effectively generating large amounts of power. In addition, the SSKGRA and NBKGRA are two of North America's prime sources of alkali metals, alkaline earth metals, and transition metals, such as lithium, potassium, rubidium, magnesium, calcium, iron, zinc, and manganese.

Brines from the SSKGRA and NBKGRA are unusually hot (up to at least 390 °C at 2 km depth), hypersaline (up to 26 wt. %), and metalliferous containing high concentrations of iron (Fe), manganese (Mn), zinc (Zn), lithium (Li), lead (Pb), copper (Cu) and other metals. The brines are primarily composed of sodium (Na), potassium (K), and calcium (Ca) chlorides, generally constituting up to about 25 percent of total dissolved solids. While the chemistry and high temperature of the Salton Sea and North Brawley brines have led to the principal challenges in developing these KGRAs, lithium and other rare earth materials have a high commodity value and are used in a range of specialized industrial and technological applications.

For lithium and power production from SSKGRA, NBKGRA, and other hypersaline brines, the prior removal of impurities, such as silica ($SiO_2$), iron, manganese, and zinc, from the geothermal brine is necessary to prevent the fouling of downstream equipment and injection wells. During impurity removal, manganese and zinc are precipitated in clarifiers, and the underflow of polymetallic oxide/hydroxide/oxychloride precipitates is captured in filter cakes.

Traditionally, similar filter cakes are hauled offsite for permitted disposal, which can significantly increase operating expenses.

In addition to saving on filter cake disposal costs, the recovery of manganese and zinc through extraction processes offers marketable value; however, the chloride salts in the hypersaline brines can interfere with downstream processing efforts to recover manganese and/or zinc from the geothermal filter cake. Manganese is essential to iron and steel production by virtue of its sulfur-fixing, deoxidizing, and alloying properties. Products for construction, machinery, and transportation are the leading end uses of manganese. Manganese is also a key component for certain widely used aluminum alloys and, in oxide form or the form of high-purity manganese sulfate monohydrate, for dry cell batteries and as a key component of lithium-ion batteries. As ore, additional quantities of manganese are used for such non-metallurgical purposes as plant fertilizers, animal feed, and colorants for brick. Zinc is also a valuable resource for producing batteries, paints, rubbers, plant fertilizers, and alloys, including brass and galvanized coatings.

SUMMARY OF THE INVENTION

Accordingly, it is an object of the inventive process to produce enhanced manganese-zinc geothermal filter cake compositions with reduced chloride concentration to improve the subsequent sequential extraction and recovery of manganese and zinc.

In general, in a first aspect, the invention relates to a process for producing an enhanced manganese-zinc geothermal filter cake composition. The process includes repulping a geothermal filter cake having an initial concentration of manganese and zinc and an initial concentration of chloride salts using a repulping liquor to form a slurried geothermal filter cake and dewatering the slurried geothermal filter cake to produce the enhanced manganese-zinc geothermal filter cake composition having an enhanced concentration of manganese and zinc and a reduced concentration of chloride salts.

In an embodiment, the polymetallic geothermal brine filter cake is a Salton Sea or North Brawley Known Geothermal Resource Area geothermal brine filter cake.

In an embodiment, the step of repulping the polymetallic geothermal filter cake includes repulping the polymetallic geothermal filter cake to form the slurried geothermal filter cake having a moisture content of between about 40% and about 95% by weight moisture (or any value or range therebetween).

In an embodiment, the step of repulping the polymetallic geothermal filter cake includes repulping the polymetallic geothermal filter cake to form the slurried geothermal filter cake having a moisture content of between about 45% and about 80% by weight moisture (or any value or range therebetween).

In an embodiment, the step of repulping the polymetallic geothermal filter cake includes a plurality of stages for repulping the geothermal filter cake with the repulp liquor to form the slurried geothermal filter cake.

In an embodiment, the slurried and/or dewatered geothermal filter cake is washed with a wash liquor to produce the enhanced manganese-zinc geothermal filter cake composition.

In an embodiment, the slurried and/or dewatered geothermal filter cake is washed using one or more stages of displacement washing with the wash liquor to produce the enhanced manganese-zinc geothermal filter cake composition.

In an embodiment, the step of washing the slurried geothermal filter cake includes countercurrent decantation washing with the wash liquor to produce the enhanced manganese-zinc geothermal filter cake composition.

In an embodiment, the enhanced manganese-zinc geothermal filter cake composition has the reduced concentration of chlorides salts of less than about 15 wt. % chloride (or any value or range therebetween). The reduced concentration of chloride salts can be less than about 5 wt. % chloride, and more preferably less than about 1 wt. % chloride.

In an embodiment, the manganese concentration in the enhanced manganese-zinc geothermal filter cake composition to between about 30 wt. % and about 55 wt. % manganese (or any value or range therebetween). The manganese concentration can be between about 36 wt. % and about 45 wt. %.

In an embodiment, the enhanced manganese-zinc geothermal filter cake composition has the enhanced concentration of manganese more than 300,000 ppm manganese or oxides/hydroxides/oxychlorides thereof (or any value or range therebetween). The enhanced concentration of manganese can be between about 300,000 ppm and about 450,000 ppm, or more particularly between about 369,000 ppm and about 421,000 ppm.

In an embodiment, the zinc concentration in the manganese-zinc geothermal filter slurry to between about 11 wt. % and about 20 wt. % zinc (or any value or range therebetween).

In an embodiment, the enhanced manganese-zinc geothermal filter cake composition has the enhanced concentration of zinc of more than 110,000 ppm zinc (or any range or value therebetween). The enhanced concentration of zinc can be between about 110,000 ppm and about 200,000 ppm, or more particularly, between about 149,000 ppm and about 177,000 ppm.

In an embodiment, the enhanced manganese-zinc geothermal filter cake composition has up to about 1 wt. % aluminum (or any value or range therebetween) and up to about 1 wt. % iron (or any value or range therebetween).

In an embodiment, the wash liquor, the repulping liquor, or both comprise water.

In an embodiment, the wash liquor, the repulping liquor, or both further comprise an alkali.

In an embodiment, the alkali is sodium carbonate ($Na_2CO_3$), potassium carbonate ($K_2CO_3$), calcium carbonate ($CaCO_3$), sodium hydroxide (NaOH), potassium hydroxide (KOH), calcium hydroxide ($Ca(OH)_2$), lithium hydroxide (LiOH), ammonium hydroxide ($NH_4OH$), or a mixture or solution thereof.

In an embodiment, the wash liquor, the repulping liquor, or both comprise less than about 100 grams of the alkali per liter of water or less than about 50 grams of the alkali per liter of water (or any value or range therebetween).

In an embodiment, the process includes recycling the wash liquor, the repulping liquor, or both.

In an embodiment, the process further includes dewatering the slurried manganese-zinc geothermal filter cake composition, such as to a moisture content of between about 10% and about 60% by weight moisture (or any value or range therebetween). The process can dewater the slurried manganese-zinc geothermal filter using pressure or vacuum filtration or centrifugation. The dewatered manganese-zinc geothermal filter cake composition can have a moisture content of between about 20% and about 45% by weight moisture or between about 44% and about 54% by weight moisture (or any value or range therebetween).

In an embodiment, the process can also include forming and/or processing the dewatered, enhanced manganese-zinc geothermal filter cake composition, and drying the formed and/or processed enhanced manganese-zinc geothermal filter cake composition, such as to a moisture content of less than about 20% by weight moisture (or any value or range therebetween).

In an embodiment, the dried manganese-zinc geothermal filter cake composition can have a moisture content of less than about 10% by weight moisture or between about 7% and about 10% by weight moisture (or any value or range therebetween).

In general, in a second aspect, the invention relates to an enhanced manganese-zinc geothermal filter cake composition with between about 30 wt. % and about 45 wt. % manganese, between about 11 wt. % and about 20 wt. % zinc, and less than about 15 wt. % chloride salts (or any value or range therebetween). The remaining is balanced by concentrations of alkali, alkaline-earth, transition, and/or other metals or oxides/hydroxides/oxychlorides thereof.

In an embodiment, the enhanced manganese-zinc geothermal filter cake composition is about 37 wt. % manganese and about 15% to about 17 wt. % zinc.

In an embodiment, the enhanced manganese-zinc geothermal filter cake composition is less than about 5 wt. % chloride salts.

In an embodiment, the enhanced manganese-zinc geothermal filter cake composition is between about 0.1 wt. % and about 1 wt. % chloride salts (or any value or range therebetween).

In an embodiment, the enhanced manganese-zinc geothermal filter cake composition is up to about 1 wt. % aluminum and up to about 1 wt. % iron (or any value or range therebetween).

In an embodiment, the enhanced manganese-zinc geothermal filter cake composition is a slurried manganese-zinc geothermal filter cake composition having a moisture content of between about 40% and about 95% by weight moisture (or any value or range therebetween).

In an embodiment, the slurried manganese-zinc geothermal filter cake composition has a moisture content of between about 45% and about 80% by weight moisture or between about 50% and about 70% by weight moisture (or any value or range therebetween).

In an embodiment, the enhanced manganese-zinc geothermal filter cake composition is a dewatered manganese-zinc geothermal filter cake composition having a moisture content of between about 10% and about 60% by weight moisture (or any value or range therebetween).

In an embodiment, the dewatered manganese-zinc geothermal filter cake composition has a moisture content of between about 20% and about 45% by weight moisture (or any value or range therebetween).

In an embodiment, the dewatered manganese-zinc geothermal filter cake composition has a moisture content of between about 44% and about 54% by weight moisture (or any value or range therebetween).

In an embodiment, the enhanced manganese-zinc geothermal filter cake composition is a dried manganese-zinc geothermal filter cake composition having a moisture content of less than about 20% by weight moisture (or any value or range therebetween).

In an embodiment, the dried manganese-zinc geothermal filter cake composition has a moisture content of less than about 10% or between about 7% and about 10% by weight moisture (or any value or range therebetween).

In general, in a third aspect, the invention relates to an enhanced manganese-zinc geothermal filter cake composition having more than about 300,000 ppm manganese, more than about 110,000 ppm zinc, and less than about 150,000 ppm chloride salts (or any value or range therebetween).

In an embodiment, the enhanced manganese-zinc geothermal filter cake composition has between about 369,000 ppm and about 421,000 ppm manganese, between about 149,000 ppm and about 177,000 ppm zinc, and less than about 50,000 ppm chloride salts (or any value or range therebetween).

In an embodiment, the enhanced manganese-zinc geothermal filter cake composition has less than about 10,000 ppm chloride salts (or any value or range therebetween).

In an embodiment, the enhanced manganese-zinc geothermal filter cake composition has less than about 10,000 ppm aluminum and less than about 10,000 ppm iron (or any value or range therebetween).

In an embodiment, the enhanced manganese-zinc geothermal filter cake composition has a specific gravity of about 3.3 to about 3.6 (or any value or range therebetween).

BRIEF DESCRIPTION OF THE DRAWINGS

The above and other objects and advantages of this invention may be more clearly seen when viewed in conjunction with the accompanying drawing wherein.

DETAILED DESCRIPTION OF THE INVENTION

Figure 1:
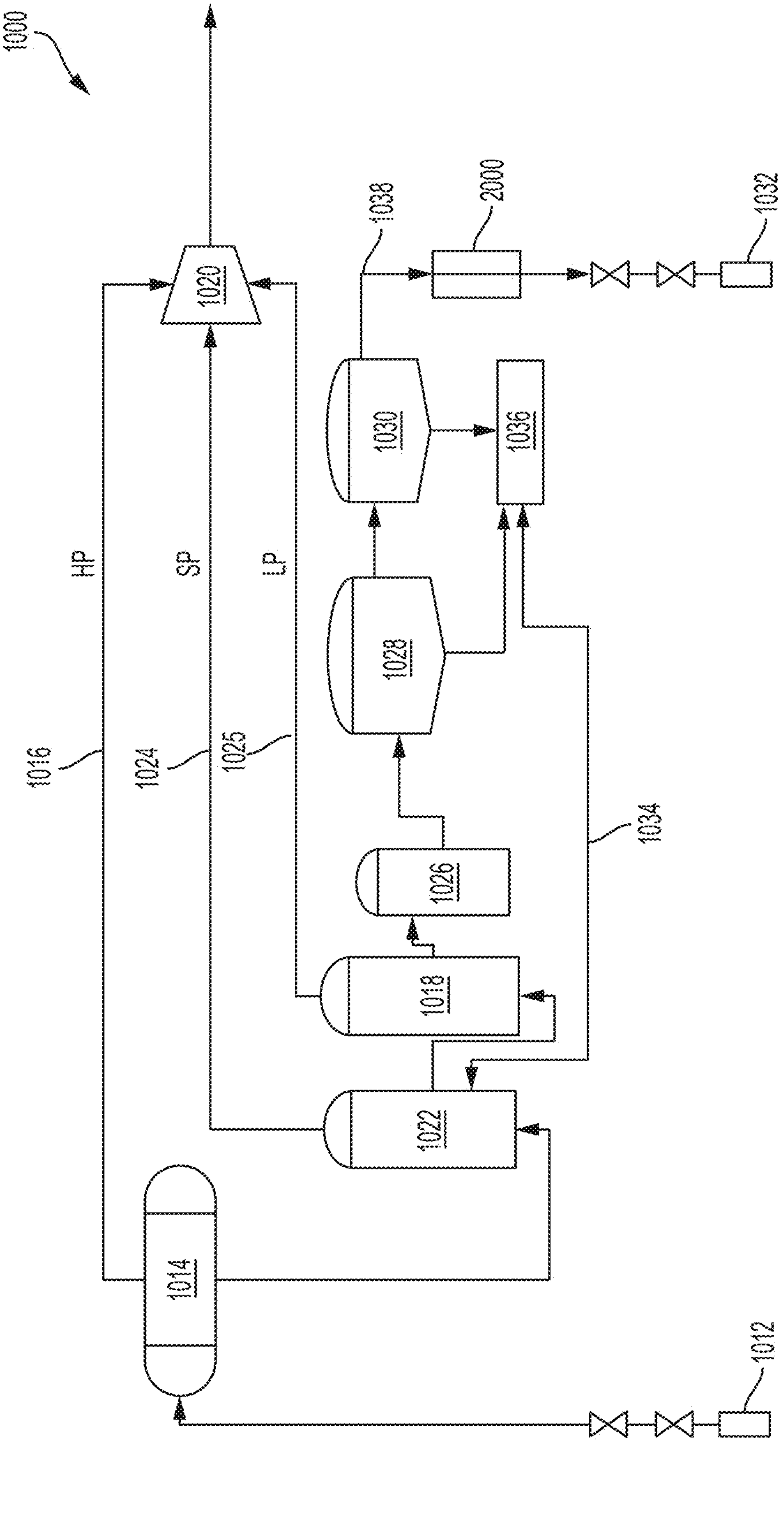
FIG. 1 PRIOR ART
FIG. 1 is a process flow diagram of an example of a crystallizer reactor clarifier process for power plant operations in the Salton Sea Known Geothermal Resource Area.

While this invention is susceptible to embodiment in many different forms, there are shown in the drawings and will herein be described hereinafter in detail some specific embodiments of the invention. It should be understood, however, that the present disclosure is to be considered an exemplification of the principles of the invention and is not intended to limit the invention to the specific embodiments so described.

The invention relates generally to a process for producing an enhanced manganese-zinc geothermal filter cake composition. After precipitation of zinc and manganese from a geothermal brine and pressing the material, the process repulps and washes the mixed polymetallic geothermal filter cake having oxides, hydroxides, and/or oxychlorides to produce an enhanced manganese-zinc geothermal filter cake composition with increased concentrations of zinc and manganese and reduced concentrations of chloride and other salts. The enhanced manganese-zinc geothermal filter cake compositions are a slurry or a filter cake made from dewatering and/or drying the enhanced slurry compositions. The slurry and filter cake compositions are enhanced because the initial concentration of chlorine and elements in the associated salts have been reduced, thereby beneficiating the constituents of interest (e.g., manganese and zinc) via the inventive processes.

The term "enhanced" in reference to an enhanced manganese-zinc geothermal filter cake composition (e.g., "enhanced, slurried manganese-zinc geothermal filter cake composition", "enhanced, dewatered manganese-zinc geothermal filter cake composition", and/or "enhanced, dried manganese-zinc geothermal filter cake composition") refers to enhanced manganese-zinc geothermal filter cake compositions that have been processed such that the concentration of manganese and zinc metal or elemental component has been increased and the concentration of soluble chloride salts has been decreased in the geothermal filter cake composition.

Zinc and manganese concentrations in the enhanced manganese-zinc geothermal filter cake composition can be increased by about 30% to about 40% for zinc and by about 25% to about 35% for manganese using the inventive process. The enhanced manganese-zinc geothermal filter cake composition can have a concentration between about 30 wt. % and about 45 wt. % manganese (or more than about 300,000 ppm manganese) (and any range or value therebetween), between about 11 wt. % and about 20 wt. % zinc (or between about 15% and about 17% zinc) (or more than about 110,000 ppm zinc) (and any range or value therebetween), and less than about 15 wt. % chloride (or less than about 150,000 ppm chloride) (or preferably less than about 5 wt. % or 50,000 ppm chloride or less than about 1 wt. % or 10,000 ppm chloride) (and any range or value therebetween), the remaining being balanced by concentrations of alkali, alkaline-earth, transition, and/or other metals. In addition, the enhanced manganese-zinc geothermal filter cake composition can have up to about 1 wt. % aluminum (or less than about 10,000 ppm aluminum) (and any value or range therebetween) and up to about 1 wt. % iron (or less than about 10,000 ppm iron) (and any value or range therebetween).

A slurried, enhanced manganese-zinc geothermal filter cake composition can have a moisture content of between about 40% and about 95% by weight moisture (or between about 45% and about 80% or between about 50% and about 70% by weight moisture) (and any range or value therebetween), and a dewatered enhanced manganese-zinc geothermal filter cake composition can have a moisture content between about 10% and about 60% by weight moisture (or between about 20% and about 45% by weight moisture) (and any range or value therebetween). The enhanced manganese-zinc geothermal filter cake composition can be dried to a moisture content of less than about 20% (or preferably less than about 10% or between about 7% and about 10%) by weight (and any range or value therebetween), and the dried, enhanced manganese-zinc geothermal filter cake composition can be agglomerated, granulated, and/or pelletized to a particle size between about 4 inches and about 100 microns. In addition, the enhanced manganese-zinc geothermal filter cake composition can have a specific gravity of about 3.3 to about 3.6 (and any range or value therebetween). The enhanced manganese-zinc geothermal filter cake composition can then be processed to extract manganese and zinc therefrom.

A geothermal brine, such as a flow from production geothermal wells in the Salton Sea or North Brawley Known Geothermal Resource Areas, is flashed into steam to power a turbine generator to produce electricity. As part of the power plant operations and processes (the "power plant operations"), scaling constituents (mainly iron silicates and amorphous silica) are selectively removed to minimize scale formation from the brine on the plant equipment, vessel internals, and associated piping before injection of spent brine back into the geothermal formation. In hypersaline geothermal brines, such as those from the SSKGRA and NBKGRA, the concentration of salt can exceed the solubility when the geothermal brine is flashed to atmospheric pressure and dilution water is added to keep the injected brine slightly below saturation with respect to salt. From this point in the power plant operations, the brine is routed to a series of reactor clarifiers to selectively reduce the concentration of silica in the injected brine to levels near saturation. The clarifiers precipitate silica and iron, along with arsenic, barium, and lead, resulting in a polished geothermal brine suitable for reinjection via the power plant injection wells.

As generally illustrated in FIG. 1, existing power plant operations 1000 involve a liquid brine flow from geothermal production wells 1012 that is partially flashed into steam due to pressure losses as the liquid brine makes its way up the production well casing. The two-phase mixture of brine and steam is routed to a high-pressure separator 1014, where the liquid brine and high-pressure steam are separated. High-pressure steam 1016 is routed from the separator 1014 to a centrifugal-type steam scrubber (not shown) that removes brine carryover from the steam, and from there, the scrubbed high-pressure steam 1016 is routed to the turbine generator 1020.

The liquid brine from the high-pressure separator 1014 is flashed into a standard-pressure crystallizer 1022, the standard-pressure steam 1024 from the standard-pressure crystallizer 1022 is passed through a steam scrubber (not shown), and the scrubbed standard-pressure steam 1024 is routed to the turbine 1020. Precipitated solids from clarifiers 1028 and 1030 are mixed with the brine in the standard-pressure crystallizer 1022, make contact with scaling materials therein, and reduce the scaling tendency in the brine significantly.

A brine slurry mixture from the standard-pressure crystallizer 1022 is flashed into a low-pressure crystallizer 1018. Low-pressure steam 1025 from the low-pressure crystallizer 1018 flows through a steam scrubber (not shown) and then either to a low-pressure turbine or to the low-pressure side of a dual entry turbine 1020. The brine slurry mixture is flashed to atmospheric pressure in an atmospheric flash tank 1026 and then flows into a primary clarifier 1028.

The primary clarifier 1028 can be an internally recirculating reactor-type clarifier that precipitates various scaling constituents, e.g., silica and iron, down to close to equilibrium values at the operating temperature of the brine, e.g., approximately 229 °F. The precipitated solids are flocculated and settled to the bottom of the primary clarifier tank 1028, and the underflow slurry flows out of the bottom of the primary clarifier 1028. A relatively clear brine overflow flows from the primary clarifier 1028 to a secondary clarifier 1030 that removes additional suspended solids, e.g., silica, iron, manganese, and zinc, from the brine. The clarified brine overflow flows out of the secondary clarifier 1030, and the underflow slurry flows out of the bottom of the secondary clarifier 1030.

Flocculent and scale inhibitors can be added between the primary clarifier 1028 and the secondary clarifier 1030 to enhance solids settling and prevent the precipitation of radioactive alkaline earth salts. The stable overflow from the secondary clarifier 1030 can be pumped to a mineral and/or lithium extraction plant 2000 or can be pumped into injection wells 1032. A portion of the precipitated solids from the underflow of the primary clarifier 1028 and the underflow of the secondary clarifier 1030 can be recycled upstream to the standard-pressure crystallizer 1022 as seed material 1034. The remainder of the accumulated solids in underflow from both the primary clarifier 1028 and the secondary clarifier 1030, which are rich in chloride salts and other precipitated impurities, are dried and transported to a landfill for disposal.

Figure 2:
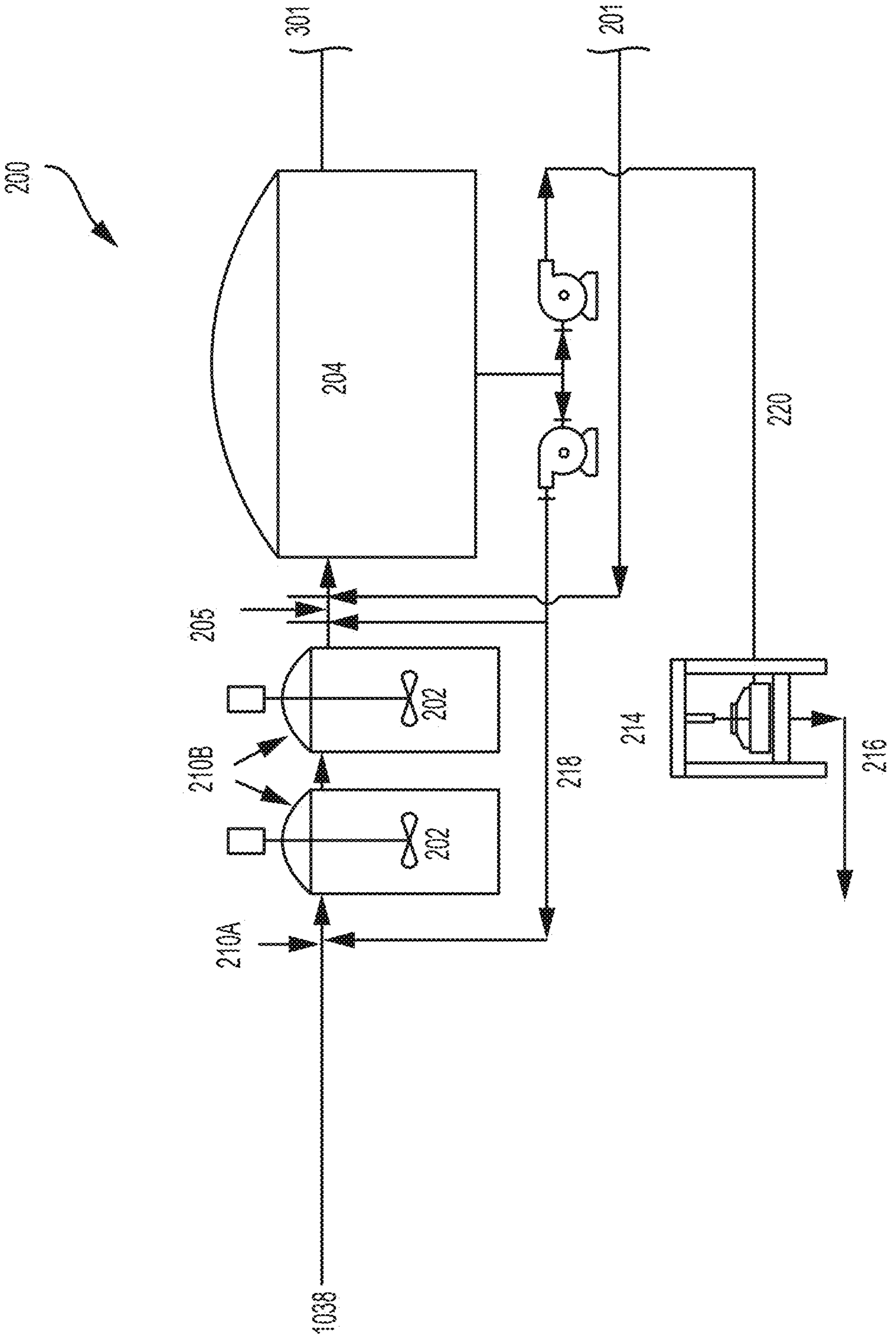
FIG. 2 is a process flow diagram of an example of a circuit for producing a silica-iron geothermal filter cake.
Figure 3:
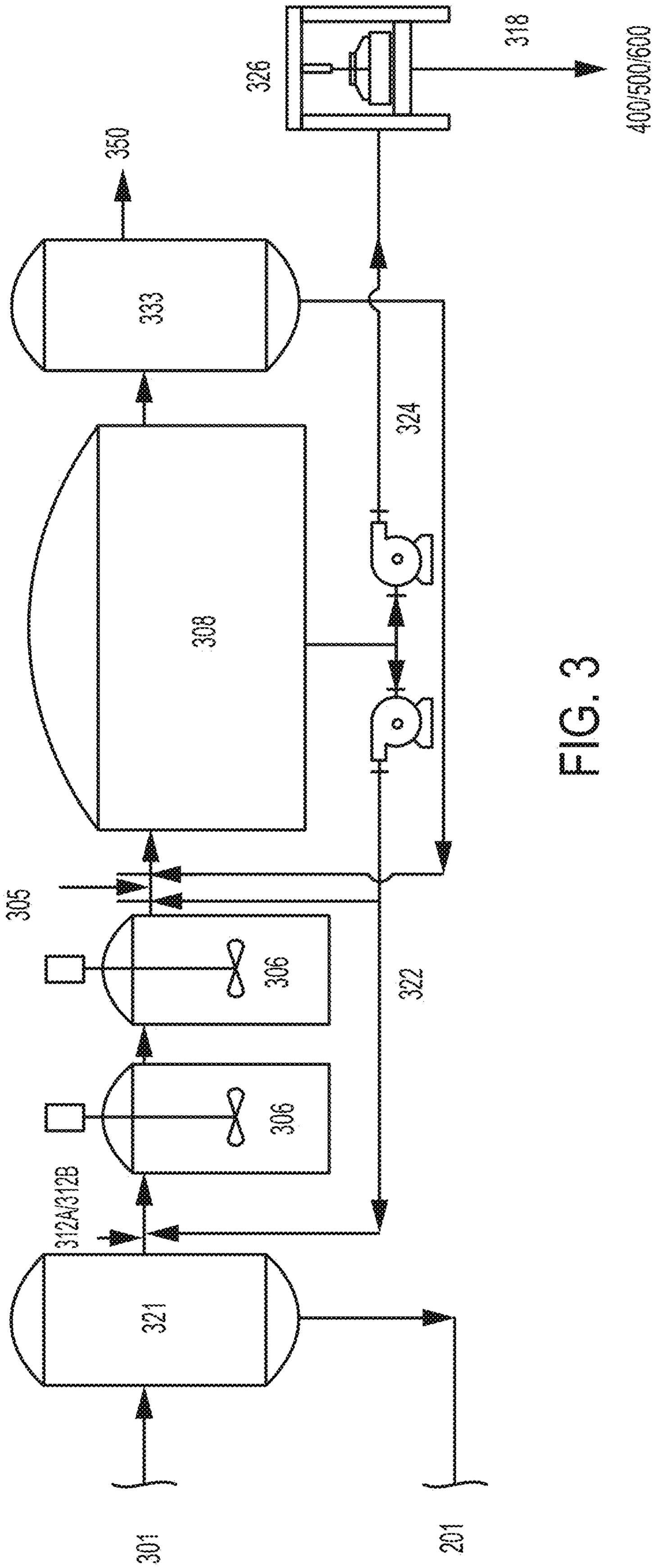
FIG. 3 is a process flow diagram of an example of a process for producing a manganese-zinc geothermal filter cake.

As illustrated in FIGS. 2 and 3, a feed brine, such as a geothermal brine or the brine 1038 that exits the overflow of the secondary clarifier 1030 from the power plant operations 1000 having reduced amounts of scaling constituents, passes to an impurity removal circuit for the removal of silica, iron, manganese, and zinc from the brine to prevent scaling and fouling of the downstream mineral and/or lithium extraction plant 2000. The impurity removal circuit has a first or iron/silica precipitation stage 200 with a first set of reaction and settling tanks 202 and 204 to remove iron and silica, followed by a second or zinc/manganese precipitation stage 300 with a second set of reaction and settling tanks 306 and 308 to remove metal hydroxides, namely manganese and zinc. The first or iron/silica precipitation stage 200 of the impurity removal circuit (FIG. 2) includes adding a basic reagent 210A (e.g., calcium carbonate ($CaCO_3$), sodium carbonate ($NaCO_3$), or lithium hydroxide (LiOH)) and injecting an oxidizer 210B (e.g., oxygen in air or hydrogen peroxide) into the feed brine 1038. The oxidizer 210B causes the iron to oxidize, and the limestone slightly elevates the brine's pH to counteract the iron's oxidization, which would otherwise reduce the pH of the brine.

A tertiary clarifier 204 is positioned downstream of the first reaction tank(s) 202 to settle out the silica and iron in the brine. A flocculant 205 can be added for additional solids-liquid separation in the tertiary clarifier 204. The underflow of precipitated solids is settled to the bottom of the tertiary clarifier 204. A relatively clear brine overflow 301 passes from the tertiary clarifier 204 to the second or zinc/manganese precipitation stage 300 of the impurity removal circuit. A portion of the precipitated solids 218 from the underflow of the tertiary clarifier 204 is recycled upstream to the reaction tanks 202 as seed material. The remaining accumulated solids 220 in the underflow of the tertiary clarifier 204 are routed to a pressure or vacuum filter 214 for dewatering. Then the iron-silica filter cake 216 can be dried and transported to a landfill for disposal or made available for end uses, such as a cement or concrete additive.

The zinc/manganese precipitation stage 300 of the impurity removal circuit (FIG. 3) includes an optional polishing filter 321 before adding slaked lime 312 (e.g., calcium oxide (CaO)) to the brine in the second reaction tank 306, which causes the brine pH to elevate to between about 7.8 and about 8.5. A quaternary clarifier 308 is positioned downstream of the second reaction tank 306 and allows the metals as oxides and/or hydroxides (primarily zinc and manganese) to precipitate and settle to the bottom of the clarifier 308. A flocculant 305 can be added for additional solids-liquid separation in the quaternary clarifier 308. A clear brine overflow from the quaternary clarifier 308 is further polished in a polishing filter 333 before being pumped to a lithium extraction circuit 350.

A portion of the precipitated solids 322 from the underflow of the quaternary clarifier 308 is recycled upstream to the reactors 306 as additional seed material, and the remaining precipitated solids 324 in the underflow of the quaternary clarifier 308 are routed to a pressure or vacuum filter 326 for initial dewatering, including one volume displacement with a water wash. The pressure filter 326 separates liquid from the solids 324 in the underflow 324, resulting in a polymetallic oxide/hydroxide/oxychloride geothermal filter cake 318 that is rich in manganese and zinc concentrations.

At this stage, the polymetallic oxide/hydroxide/oxychloride geothermal filter cake 318 contains approximately 50 wt. % solids while retaining about 50 wt. % liquids, which includes a mixture of wash liquor from the first filtration at the pressure filter 326 and residual feed brine 1038 with a high concentration of dissolved and precipitated chloride salts (e.g., soluble sodium, potassium, and calcium chloride) that are tightly bound and difficult to remove from the polymetallic oxide/hydroxide/oxychloride geothermal filter cake 318 using only a single displacement wash. As a result, the polymetallic oxide/hydroxide/oxychloride geothermal filter cake 318 obtained from the zinc/manganese precipitation stage 300 includes chlorides that could interfere with a downstream mineral recovery process and circuit 3000 for separating manganese and zinc from the polymetallic oxide/hydroxide/oxychloride geothermal filter cake 318, thereby limiting marketable or downstream processing opportunities for the polymetallic oxide/hydroxide/oxychloride geothermal filter cake 318. For example, chlorine and hydrochloric acid derived from chloride are destructive to kilns used in pyrometallurgical processes for zinc and manganese separation. Further, if the polymetallic oxide/hydroxide/oxychloride geothermal filter cake 318 is shipped offsite for further processing, chlorides (and, in particular, calcium chloride) are hygroscopic and will cause the polymetallic oxide/hydroxide/oxychloride geothermal filter cake 318 to retain moisture, thus increasing shipping costs. The retained moisture will also enable the polymetallic oxide/hydroxide/oxychloride geothermal filter cake 318 to liquefy when vibrated and agitated in truck beds and rail cars, creating further complications for transport. Therefore, repulping and washing to remove these residual, geothermal brine-related chlorides is necessary for producing high-quality zinc and manganese products cost-effectively. For most downstream processing, especially with sulfate-related products such as high-purity manganese sulfate monohydrate, chlorides should be removed to reasonable levels of less than about 5% by weight and ideally less than about 1% by weight.

To recover the valuable minerals as separate products, the polymetallic oxide/hydroxide/oxychloride geothermal filter cake 318 is sent to a wash process and circuit to produce an enhanced manganese-zinc geothermal filter cake composition having an increased concentration of metal oxides and hydroxides and a decreased concentration of soluble chloride salts. The process and circuit repulp and wash the polymetallic oxide/hydroxide/oxychloride geothermal filter cake 318 to remove impurities, such as soluble sodium, potassium, and calcium chlorides, and separating these soluble chloride salts from the metal oxides, hydroxides, and/or oxychlorides increases the percentage by weight of recoverable metal oxides and hydroxides, e.g., manganese and zinc, in the enhanced geothermal filter cake composition. The enhanced geothermal filter cake composition, in a slurried, dewatered, or dried state, can then be further processed to separate zinc and manganese. By isolating zinc and manganese into separate process streams, the downstream mineral recovery process(es) can produce valuable high-purity products including, but not limited to, zinc sulfate, zinc oxide, zinc metal, manganese sulfate monohydrate, and electrolytic manganese metal.

The inventive wash process involves repulping the polymetallic hydroxide filter cake 318 from the zinc/manganese precipitation stage 300 of the impurity removal circuit. The polymetallic oxide/hydroxide/oxychloride geothermal filter cake 318 is repulped in one or more stages using a repulping liquor to produce a slurried geothermal filter cake. The geothermal filter cake 318 can be repulped in a suitable industrial pulper, such as a tank with an impeller, a hydrapulper, or a drum pulper. The repulping liquor includes water with or without an alkali or basic reagent, such as sodium carbonate ($Na_2CO_3$), potassium carbonate ($K_2CO_3$), calcium carbonate ($CaCO_3$), sodium hydroxide (NaOH), potassium hydroxide (KOH), calcium hydroxide ($Ca(OH)_2$), lithium hydroxide (LiOH), ammonium hydroxide ($NH_4OH$), or a mixture or solution thereof. The water can be from any suitable supply sufficiently low in concentration of the constituents that are being washed out (e.g., dilution, tap, deionized, makeup, canal, recycled), and the alkali (e.g., soda ash) can be up to about 100 grams (preferably less than about 50 grams or less than about 10 grams) (and any value or range therebetween) of alkali per liter of water. The efficient repulping in stages and at temperatures between about 30 °C and about 95 °C (or between about 55 °C and about 95 °C) (or any value or range therebetween) can reduce chlorides in the slurried geothermal filter cake to less than about 0.5% by weight.

The slurried geothermal filter cake can be washed in one or more stages with a wash liquor to produce an enhanced, slurried manganese-zinc geothermal filter cake composition having between about 40% and about 95% (or between about 45% and about 80% or between about 50% and about 70%) by weight moisture. As described below, the slurried geothermal filter cake can be washed using one or more displacement washes with one or more bed volumes of the wash liquor or washed using countercurrent decantation. The wash liquor includes water with or without an alkali or basic reagent, such as sodium carbonate ($Na_2CO_3$), potassium carbonate ($K_2CO_3$), calcium carbonate ($CaCO_3$), sodium hydroxide (NaOH), potassium hydroxide (KOH), calcium hydroxide ($Ca(OH)_2$), lithium hydroxide (LiOH), ammonium hydroxide ($NH_4OH$), or a mixture or solution thereof. Like the repulping liquor, the water for the wash liquor can be from any suitable supply sufficiently low in concentration of the constituents that are being washed out (e.g., dilution, tap, deionized, makeup, canal, recycled), and the alkali (e.g., soda ash) can be up to about 100 grams (preferably less than about 50 grams or less than about 10 grams) (and any value or range therebetween) of alkali per liter of water.

Figure 4:
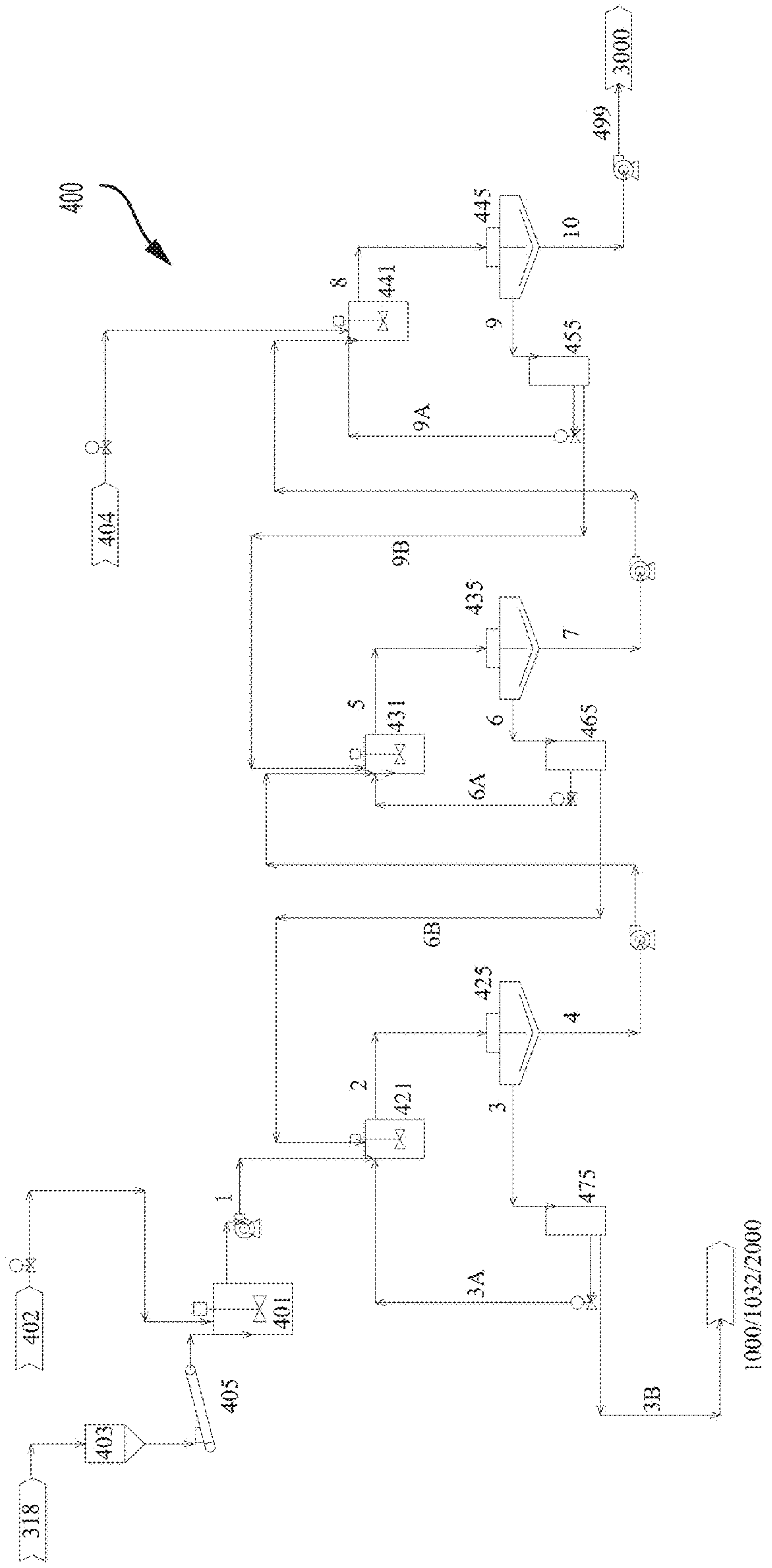
FIG. 4 is a process flow diagram of an example of a countercurrent decantation washing process for producing a slurried manganese-zinc geothermal filter cake composition in accordance with an illustrative embodiment of the invention disclosed herein.

As exemplified in FIG. 4, the slurried manganese-zinc geothermal filter cake composition can be routed directly to the process and circuit 3000 for sequentially recovering manganese and zinc products, or (e.g., as exemplified in FIG. 5), the enhanced slurried manganese-zinc geothermal filter cake composition can be dewatered to produce an enhanced, dewatered geothermal filter cake composition having between about 10% and about 60% (or between about 20% and about 45%) (or any value or range therebetween) by weight retained moisture. The slurried geothermal filter cake can be dewatered using a vacuum- or pressure-filter, a centrifuge, or another suitable dewatering equipment or circuit.

Figure 6:
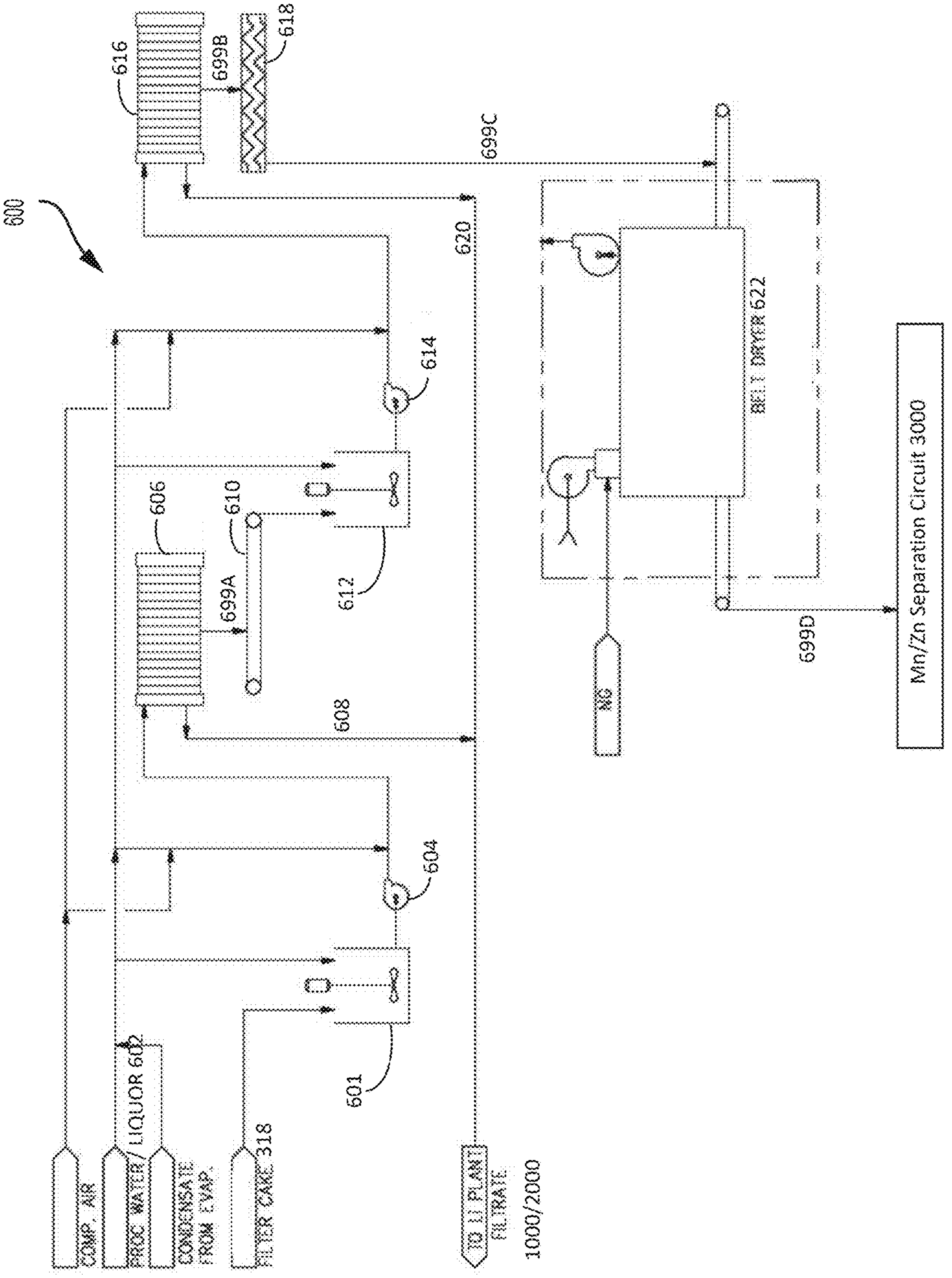
FIG. 6 is a process flow diagram of another example of a process for producing a dried manganese-zinc geothermal filter cake composition in accordance with an illustrative embodiment of the invention disclosed herein.

As illustrated in FIG. 6, the dewatered manganese-zinc geothermal filter cake composition can be dried to produce an enhanced, dried manganese-zinc geothermal filter cake composition having less than about 20% (or less than about 10% or between about 7% and about 10%) by weight retained moisture. The dewatered manganese-zinc geothermal filter cake composition and/or the dried manganese-zinc geothermal filter cake composition can be stored, shipped, or sent for further processing by the process and circuit 3000 for sequentially recovering manganese and zinc products. For example, as illustrated in FIG. 4, the inventive process and circuit can include a multi-stage countercurrent decantation ("CCD") wash process and circuit 400 configured to thoroughly mix the polymetallic oxide/hydroxide/oxychloride geothermal filter cake 318 with repulp liquor 402 to efficiently remove soluble materials, mainly alkali and alkaline earth chlorides, to form a slurried manganese-zinc geothermal filter cake composition 499 with enhanced concentrations of polymetallic oxides and hydroxides, namely Mn and Zn. The CCD process 400 utilizes the countercurrent flow of wash liquor 404 and the slurried geothermal filter cake composition, moving the solids in the underflow (streams 4, 7, and 10) and wash liquor in the overflow (streams 3, 6, and 9) in opposite directions. Most of the wash liquor 404 is added in the last separation step (thickener 445). As the wash liquor moves backward from the last separation stage, it increases in dissolved chlorides as the wash liquor passes through to the first separation step (thickener 425).

As illustrated, the CCD process and circuit 400 include a plurality of thickener split tanks (475, 465, and 455) that spilt the clarifier overflows (streams 3, 6, and 9) and recycle a portion back to the mix tank (streams 3A, 6A, and 9A) and the remainder countercurrently to the adjacent mix tank (streams 6B and 9B). A portion of the chloride-laden wash liquor (filtrate) 3B from the overflow from thickener 425 is recycled back to a desired point in the power plant 1000 and/or the mineral extraction circuit 2000. Recycling the chloride-laden filtrate 3B also recycles a small quantity (100 ppm or less) of lithium, manganese, and zinc to the upstream or downstream operation streams. The underflow of the slurried manganese-zinc geothermal filter cake composition decreases in dissolved solids, particularly chlorides, and enhances in Mn and Zn (and oxides and hydroxides thereof) concentrations as the slurried geothermal filter cake composition flows from the first separation step (thickener 425) to the last separation step (thickener 445). The slurried manganese-zinc geothermal filter cake composition 499 can be directly sent to the manganese-zinc recovery process and circuit 3000 and can be processed into separate Mn and Zn saleable products.

As shown in FIG. 4, the polymetallic oxide/hydroxide/oxychloride geothermal filter cake 318 from the zinc/manganese precipitation stage 300 of the impurity removal circuit is routed through a material bin 403 to feed a conveyor 405, which will feed the polymetallic oxide/hydroxide/oxychloride geothermal filter cake 318 to a repulp tank 401. The filter cake 318 is mixed with repulp liquor 402 in the repulp tank 401 to produce a 15% to about 25% by weight slurry. The slurry is routed (stream 1) to a first-stage thickener mix tank 421, where it is mixed with the overflow (stream 6B) from the second thickener split tank 465 and the recycled wash liquor (stream 3A) from the first thickener split tank 475. The diluted slurry (stream 2) is then processed through the first thickener 425, where the liquid (chloride-laden wash liquor) and the Mn/Zn solids are separated as thickener overflow (stream 3) and underflow (stream 4), respectively. A portion of the thickener overflow (stream 3A) is recycled to the mix tank 421 to provide increased solids and liquid contact and mixing in the thickener 425 and aid in dissolving chlorides and solids settling rates in the thickener 425. The other portion of the thickener overflow (stream 3B) is recycled to the power plant 1000 and/or the mineral extraction circuit 2000 or can be routed for reinjection 1032. A high molecular weight polyelectrolyte flocculant can be added to one or more of the thickener mix tanks 421, 431, and/or 441 in the process 400 for additional aid in solids-liquid separation in the thickener 425, 435, and/or 445. The thickener 425 underflow (stream 4) is pumped to the second thickener mix tank 431, where it is mixed with overflow (stream 9B) from thickener 445. The wash process 400 is repeated in the thickener 445, except fresh wash liquor 404 is introduced and mixed with underflow (stream 7) from the thickener 435 and the recycled overflow (stream 9A) from the third thickener split tank 455. The underflow (stream 10) forming the slurried manganese-zinc geothermal filter cake composition 499 can be directly sent to the manganese-zinc recovery process and circuit 3000. Alternatively, the slurried manganese-zinc geothermal filter cake composition 499 can be dewatered and/or dried before being sent to the manganese-zinc recovery process and circuit 3000.

Since the CCD process 400 dissolves the chloride salt rather than precipitates valuable minerals, the overflows are recycled rather than the underflows. This CCD process 400 reuses wash liquor and possibly flocculent, thereby providing longer overall residence time in the system and better mixing for salt dissolution. The recycle flow (stream 3B) to the power plant operations 1000 and/or the mineral extraction circuit 2000 can be controllable for optimization. The CCD wash process 400 results in the slurried manganese-zinc geothermal filter cake composition 499 having reduced chlorides and enhanced Mn and Zn concentrations being pumped for further processing from the thickener 445 underflow (stream 10). The repulp liquor 402 and/or the wash liquor 404 can include water sourced from the cooling tower blowdown of the power plant 1000, canal or external wash liquor, dilution water, or a combination thereof. The repulp liquor 402 and/or wash liquor 404 can also include a suitable alkali, namely sodium carbonate, to aid in reducing chlorides and enhancing Mn and Zn concentrations.

TABLE 1

CCD WASH MASS BALANCE

| | Stream | | | | | | |
|---|---|---|---|---|---|---|---|
| | 1 | 2 | 3 | 4 | 5 | 6 | 7 |
| Mass, st/h | 38 | 137.9 | 115.3 | 22.59 | 137.9 | 115.3 | 22.59 |
| gpm Slurry | 121.4 | 483.8 | 418.3 | 65.51 | 483.8 | 418.3 | 65.51 |

TABLE 1-continued

| CCD WASH MASS BALANCE | | | | | | | |
|---|---|---|---|---|---|---|---|
| SG Slurry | 1.25 | 1.138 | 1.101 | 1.378 | 1.138 | 1.101 | 1.378 |
| % Solids | 17.88 | 5 | 0.1 | 30 | 5 | 0.1 | 30 |
| Zn, ppm | 149634 | 149634 | 149634 | 149634 | 149634 | 149634 | 149634 |
| Mn, ppm | 376183 | 376183 | 376183 | 376183 | 376183 | 376183 | 376183 |
| Temp, °F | 93.02 | 93.02 | 93.02 | 93.02 | 93.02 | 93.02 | 93.02 |
| pH | 0.787 | 0.787 | 0.787 | 0.787 | 0.787 | 0.787 | 0.787 |
| SOLIDS (wt %) | | | | | | | |
| H | 0.159 | 0.159 | 0.159 | 0.159 | 0.159 | 0.159 | 0.159 |
| O | 29.08 | 29.08 | 29.08 | 29.08 | 29.08 | 29.08 | 29.08 |
| Na | 0.638 | 0.638 | 0.638 | 0.638 | 0.638 | 0.638 | 0.638 |
| Al | 0.235 | 0.235 | 0.235 | 0.235 | 0.235 | 0.235 | 0.235 |
| Si | 9.958 | 9.958 | 9.958 | 9.958 | 9.958 | 9.958 | 9.958 |
| S | 0 | 0 | 0 | 0 | 0 | 0 | 0 |
| Cl | 2.390 | 2.390 | 2.390 | 2.390 | 2.390 | 2.390 | 2.390 |
| K | 0.214 | 0.214 | 0.214 | 0.214 | 0.214 | 0.214 | 0.214 |
| Ca | 3.847 | 3.847 | 3.847 | 3.847 | 3.847 | 3.847 | 3.847 |
| Mn | 37.62 | 37.62 | 37.62 | 37.62 | 37.62 | 37.62 | 37.62 |
| Fe | 0.898 | 0.898 | 0.898 | 0.898 | 0.898 | 0.898 | 0.898 |
| Zn | 14.96 | 14.96 | 14.96 | 14.96 | 14.96 | 14.96 | 14.96 |

| | Stream | | | | | |
|---|---|---|---|---|---|---|
| | 8 | 9 | 10 | 499 | 318 | 402/404 |
| Mass, st/h | 136.9 | 68.37 | 22.44 | 22.44 | 21.11 | 45.97 |
| gpm Slurry | 515.8 | 266.7 | 69.33 | 69.33 | 59.62 | 183.9 |
| SG Slurry | 1.06 | 1.024 | 1.293 | 1.293 | 1.414 | 0.998 |
| % Solids | 5 | 0.1 | 30 | 30 | 45 | 0 |
| Zn, ppm | 149634 | 149634 | 149634 | 149634 | 107000 | 0 |
| Mn, ppm | 376183 | 376183 | 376183 | 376183 | 269000 | 0 |
| Temp, °F | 74.14 | 74.14 | 74.14 | 74.14 | 68 | 68 |
| pH | 1.41 | 1.41 | 1.41 | 1.41 | 7 | 7 |
| | SOLIDS (wt %) | | | | | |
| H | 0.159 | 0.159 | 0.159 | 0.159 | 0.114 | 0 |
| O | 29.08 | 29.08 | 29.08 | 29.08 | 20.80 | 0 |
| Na | 0.638 | 0.638 | 0.638 | 0.638 | 5.700 | 0 |
| Al | 0.235 | 0.235 | 0.235 | 0.235 | 0.168 | 0 |
| Si | 9.958 | 9.958 | 9.958 | 9.958 | 7.120 | 0 |
| S | 0 | 0 | 0 | 0 | 0 | 0 |
| Cl | 2.390 | 2.390 | 2.390 | 2.390 | 19.00 | 0 |
| K | 0.214 | 0.214 | 0.214 | 0.214 | 1.699 | 0 |
| Ca | 3.847 | 3.847 | 3.847 | 3.847 | 7.162 | 0 |
| Mn | 37.62 | 37.62 | 37.62 | 37.62 | 26.90 | 0 |
| Fe | 0.898 | 0.898 | 0.898 | 0.898 | 0.642 | 0 |
| Zn | 14.96 | 14.96 | 14.96 | 14.96 | 10.70 | 0 |

TABLE 2

CCD WASH AND FINAL SLURRY

| | | Geothermal Filter Cake | Wash 1 | Wash 2/3 | Final Slurry |
|---|---|---|---|---|---|
| | | Quant (mL/g) | | | |
| Element | Units | 126 Assay (mg/L, %, g/t) | 258 | 514.1 | 82.6 |
| Si | mg/L, % | 0.66 | | | 1.0 |
| Li | mg/L, g/t | 226 | 74 | 18 | 6.0 |
| Al | mg/L, g/t | 1677 | <0.8 | <0.8 | 2690 |
| Fe | mg/L, g/t | 6420 | <0.2 | <0.2 | 9890 |
| Mg | mg/L, g/t | 8027 | 993 | 250 | 9800 |
| Ca | mg/L, g/t | 48833 | 13400 | 3700 | 19000 |
| Na | mg/L, g/t | 56600 | 20200 | 4910 | 2820 |
| K | mg/L, g/t | 16700 | 6120 | 1570 | 977 |
| Ti | mg/L, g/t | 98 | <0.02 | <0.02 | 219 |
| P | mg/L, g/t | <60 | <5 | <5 | 50 |
| Mn | mg/L, g/t | 269000 | 3140 | 1620 | 372000 |
| Cr | mg/L, g/t | <4 | <0.1 | <0.1 | 10 |
| V | mg/L, g/t | <4 | <0.2 | <0.2 | 10 |
| Ba | mg/L, g/t | 1077 | 32.2 | 64.7 | 1700 |
| Sr | mg/L, g/t | 562 | 162 | 56.6 | 329 |

TABLE 2-continued

CCD WASH AND FINAL SLURRY

| | | Geothermal Filter Cake | Wash 1 | Wash 2/3 | Final Slurry |
|---|---|---|---|---|---|
| | | Quant (mL/g) | | | |
| Element | Units | 126 Assay (mg/L, %, g/t) | 258 | 514.1 | 82.6 |
| Cu | mg/L, g/t | 121 | <0.1 | <0.1 | 187 |
| Pb | mg/L, g/t | 5407 | <2 | <2 | 8370 |
| Zn | mg/L, g/t | 107000 | <0.7 | <0.7 | 166000 |

The CCD process 400 exemplified in FIG. 4 could be utilized with suitable filters either in place of or in combination with the thickeners 425, 435, and 445 with the filtrates and residues advancing countercurrently. In addition, the inventive process and circuit can utilize more or less stages of repulping, dewatering, washing, settling/filtering, and/or drying than those illustrated.

Figure 5:
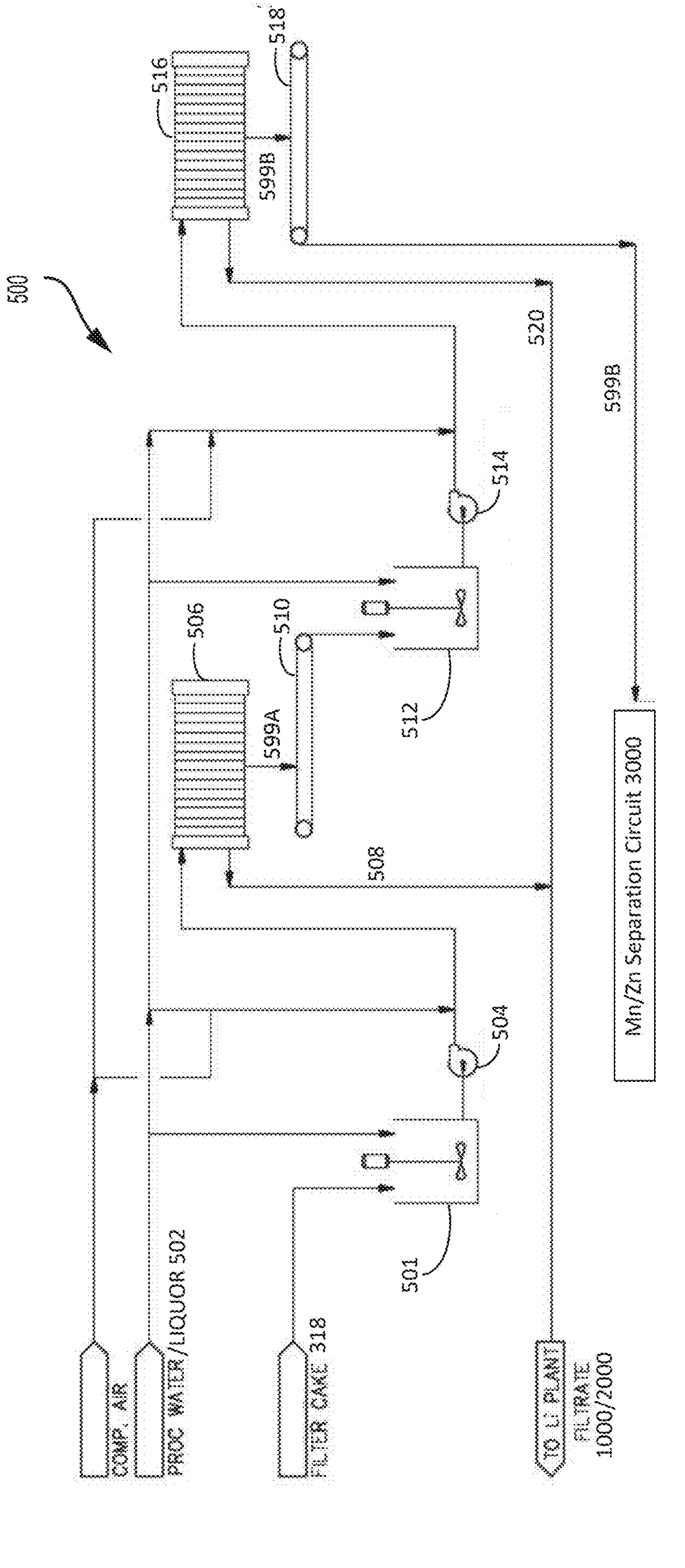
FIG. 5 is a process flow diagram of an example of a process for producing a dewatered manganese-zinc geothermal filter cake composition in accordance with an illustrative embodiment of the invention disclosed herein.

FIG. 5 shows the wash circuit configured as a dual-repulp and filter circuit 500. The exemplified wash circuit 500 includes a first-stage repulp tank 501 where repulp liquor

502 containing low chloride concentrations is added to repulp the polymetallic oxide/hydroxide/oxychloride geothermal filter cake 318 to produce a 15% to about 25% by weight slurry. The slurry is pumped with a first-stage slurry pump 504 to a first-stage pressure- or vacuum-type filter, a centrifuge, or another suitable dewatering equipment or circuit 506 where the slurry is dewatered to produce a dewatered manganese-zinc geothermal filter cake composition 599A. For example, the slurry can be dewatered at about 20 inches mercury (0.68 bar) of vacuum or at about 5.5 bar (80 PSI) to about 6.9 bar (100 PSI) pressure levels. The dewatered manganese-zinc geothermal filter cake composition 599A is routed from the first-stage filter 506 to a first-stage conveyor 510 or similar solids transport device to the manganese-zinc recovery process and circuit 3000, or as exemplified in the dual-repulp and filter circuit 500 of FIG. 5, to a second-stage repulp tank 512 for reslurrying with repulp liquor 502 and final chloride removal. The chloride-laden filtrate 508 from the filter 506 is recycled to a desired location at the power plant operations 1000 and/or the mineral extraction circuit 2000 since the chloride-laden filtrate 508 is chemically compatible with these operation streams. From the second-stage repulp tank 512, the repulped slurry of the dewatered manganese-zinc geothermal filter cake composition 599A is pumped with a second-stage slurry pump 514 to a second-stage filter or centrifuge 516 for additional dewatering using a vacuum- or pressure-filter, a centrifuge, or another suitable dewatering equipment or circuit (e.g., horizontal vacuum belt filter at about 20 inches mercury (0.68 bar) of vacuum). The filter filtrate 520 is recycled with the chloride-laden filtrate 508 back to a desired location at the power plant operations 1000 and/or the mineral extraction circuit 2000. The dewatered manganese-zinc geothermal filter cake composition 599B can then be routed from the second-stage filter 516 to a second-stage conveyor 518 to be sent for transport or to the manganese-zinc recovery process and circuit 3000. The inventive process and circuit may utilize more or less stages of repulping and dewatering than those illustrated.

Turning now to FIG. 6 illustrating another dual-repulp wash circuit 600, the polymetallic oxide/hydroxide/oxychloride geothermal filter cake 318 is conveyed to a first-stage repulp tank 601 where repulp liquor 602 containing low chloride concentrations is added to repulp the polymetallic oxide/hydroxide/oxychloride geothermal filter cake 318 in the first-stage repulp tank 601 into a 15% to about 25% by weight slurry. The slurry is pumped with a slurry pump 604 from the repulp tank 601 to a filter or centrifuge 606 (e.g., a pressure- or vacuum-type filter, a centrifuge, or another suitable dewatering equipment or circuit) where the slurry is dewatered. As illustrated, the dewatered manganese-zinc geothermal filter cake composition 699A is routed from the filter 606 to a first-stage conveyor 610 or similar solids transport device to a second-stage repulp tank 612 for reslurrying the dewatered manganese-zinc geothermal filter cake composition 699A with repulp liquor 602 and final chloride removal. The chloride-laden filtrate 608 from the filter 606 is recycled to a desirable point in the power plant operations 1000 and/or the mineral extraction circuit 2000. From the second-stage repulp tank 612, the repulped slurry of the dewatered manganese-zinc geothermal filter cake composition 699A is pumped with a slurry pump 614 to a second-stage filter or centrifuge 616 for dewatering. The chloride content of the polymetallic oxide/hydroxide/oxychloride geothermal filter cake 318 is reduced from approximately 15% down to about 0.5% by weight or less in the dewatered manganese-zinc geothermal filter cake composition 699B using the dual-repulp wash process and circuit 600. The filtrate 620 is recycled with the chloride-laden filtrate 608 back to the power plant operations 1000 and/or the mineral extraction circuit 2000.

In the embodiment illustrated in FIG. 6, the dewatered manganese-zinc geothermal filter cake composition 699B from the second-stage filter 616 can be dried in a dryer 622 to produce a dried manganese-zinc geothermal filter cake composition 699D having less than about 20% by weight (or less than about 10% or between about 5% and about 10% by weight) retained moisture. The dryer 622 can be any suitable industrial dryer for drying extruded, granular, or pelletized materials, such as a belt dryer, a rotary drum dryer, a flash dryer, or a fluidized bed dryer using steam heat, electric heat, or gas-fired heat, which can be combined with recycled heat from a dryer baghouse. The dried manganese-zinc geothermal filter cake composition 699D can be shipped or routed to the mineral recovery process and circuit 3000 for sequentially recovering manganese and zinc products. As shown in FIG. 6, the dewatered manganese-zinc geothermal filter cake composition 699B can be discharged to a forming and/or processing device 618, such as an agglomeration, casting, rolling, extrusion, granulation, pelletizing, or a combination thereof device(s) 618 before being dried. By way of non-limiting examples, the dewatered manganese-zinc geothermal filter cake composition 699B can be agglomerated using a suitable industrial mixer, such as a paddle, ribbon, plow, tumbler, or drum mixer device, extruded using a suitable industrial extruder, such as a screw or ram extruding device, granulated using an oscillating, extrusion, fluidized bed, or sheer granulator device, and/or pelletized using a disc, drum, strand, or fluidized bed pelletizer, or a combination thereof. The shaped and/or processed cake composition 699C is then fed into the dryer 622, where the particle size is between 100 microns and 4 inches, depending on end-use requirements. The dried manganese-zinc geothermal filter cake composition 699D can be loaded into a truck and/or bagged for shipment for further process or routed to the mineral recovery process and circuit 3000. The inventive process and circuit may utilize more or less stages of repulping, dewatering, and drying than those illustrated.

Zinc and manganese concentrations in the enhanced manganese-zinc geothermal filter cake composition to about 30 wt. % and about 45 wt. % (or between about 300,000 ppm and about 450,000 ppm) manganese, between about 11 wt. % and about 20 wt. % (or between about 110,000 ppm and about 200,000 ppm) zinc. The circuit and process can also remove soluble sodium, potassium, and calcium chlorides to less than about 5 wt. % chloride. In addition, the enhanced manganese-zinc geothermal filter cake composition can have concentrations of aluminum and iron, e.g., up to about 1% aluminum (or less than about 10,000 ppm aluminum) and up to about 1% iron (or less than about 10,000 ppm iron).

EXAMPLES

The process for producing the enhanced manganese-zinc geothermal filter cake composition is further illustrated by the following examples, which are provided for the purpose of demonstration rather than limitation.

Example 1

In this example, an analysis was performed on the effects of a bulk washing process on the composition of a slurried manganese-zinc geothermal filter cake composition relative to an unwashed geothermal filter cake. The results are depicted in Tables 3, 4, and 5.

TABLE 3

| Element | Units | Geothermal Filter Cake | Three-Stage Wash | Four-Stage Wash |
|---|---|---|---|---|
| Si | mg/L, % | 0.66 | 1.0 | 1.00 |
| Li | mg/L, % | 226 | 6.0 | |
| Al | mg/L, % | 1677 | 2690 | <3000 |
| Fe | mg/L, % | 6420 | 9890 | 9520 |
| Mg | mg/L, % | 8027 | 9800 | 9660 |
| Ca | mg/L, % | 48833 | 19000 | 20700 |
| Na | mg/L, % | 56600 | 2820 | 7060 |
| K | mg/L, % | 16700 | 977 | 2580 |
| Ti | mg/L, % | 98 | 219 | 189 |
| P | mg/L, % | <60 | 50 | <50 |
| Mn | mg/L, % | 269000 | 372000 | 369000 |
| Cr | mg/L, % | <4 | 10 | <40 |
| V | mg/L, % | <4 | 10 | <80 |
| Ba | mg/L, % | 1077 | 1700 | |
| Sr | mg/L, % | 562 | 329 | |
| Cu | mg/L, % | 121 | 187 | |
| Pb | mg/L, % | 5407 | 8370 | |
| Zn | mg/L, % | 107000 | 166000 | 149000 |

TABLE 4

| Element | Units | Geothermal Filter Cake | Repulped | Wash 1/2 | Wash 3/4 | Final Res | Rewash Res |
|---|---|---|---|---|---|---|---|
| Si | mg/L, % | 0.87 | | | | | |
| Li | mg/L, % | 96 | <30 | 5 | 2 | <30 | <10 |
| Al | mg/L, % | 1880 | 2600 | <1 | <1 | 2520 | 2360 |
| Fe | mg/L, % | 14400 | 18700 | <0.2 | <0.2 | 19400 | 19000 |
| Mg | mg/L, % | 13700 | 9760 | 340 | 136 | 10400 | 8890 |
| Ca | mg/L, % | 32400 | 20700 | 1330 | 384 | 17100 | 13400 |
| Na | mg/L, % | 23200 | 5920 | 1240 | 221 | 466 | 70 |
| K | mg/L, % | 7360 | 1920 | 410 | 59 | 469 | 320 |
| Ti | mg/L, % | 98.1 | 221 | <0.02 | <0.02 | 134 | 140 |
| P | mg/L, % | <200 | <200 | <5 | <5 | <200 | <200 |
| Mn | mg/L, % | 312000 | 421000 | 978 | 417 | 401000 | 413000 |
| Cr | mg/L, % | 9 | 12 | <0.1 | <0.1 | 12 | 12 |
| V | mg/L, % | 7 | 6 | <0.2 | <0.2 | 5 | 6 |
| Ba | mg/L, % | 1800 | 2040 | 15.1 | 10.2 | 2200 | 2120 |
| Sr | mg/L, % | 365 | 209 | 21.2 | 8.33 | 140 | 110 |
| Cu | mg/L, % | 34.3 | 32.9 | <0.2 | <0.2 | 26.3 | 37 |
| Pb | mg/L, % | 8870 | 11700 | <2 | <2 | 11600 | 11500 |
| Zn | mg/L, % | 127000 | 176000 | <0.7 | <0.7 | 168000 | 177000 |

TABLE 5

| | Unwashed Cake (ppm) | Unwashed Cake (wt. %) | Washed Cake (ppm) | Washed Cake (wt. %) |
|---|---|---|---|---|
| Manganese | 312,000 | 31.20 | 413,000 | 41.30 |
| Zinc | 127,000 | 12.70 | 177,000 | 17.70 |
| Aluminum | 1880 | 0.18 | 2,360 | 0.23 |
| Iron | 14,440 | 1.44 | 19,000 | 1.90 |
| Potassium | 7,360 | 0.74 | 320 | 0.03 |
| Calcium | 32,400 | 3.24 | 13,400 | 1.34 |
| Sodium | 23,200 | 2.32 | 70 | 0.07 |

When analyzing the assays of the slurried manganese-zinc geothermal filter cake composition compared to unwashed geothermal filter cake, the weight percentage of some elements significantly increased while the weight percentage of others significantly decreased. The presence of Na and K chloride salts was reduced by about 10 times, and Ca chloride salt was reduced by about half. The presence of each of the elements Zn, Ba, Cu, Pb, Fe, Al, and Si was increased between 1.2 and 1.4 times. The prevalence of these elements after washing indicates that only a small portion of these elements, if any, were washed out with a water wash. Silica is a good element to use as a basis for these calculations since it should be insoluble in a water wash. The ratios for Li, Na, and K were around 0.05, which indicates that these elements were present as chlorides and were washed out. For Ca, the ratio was 0.4, indicating that some but not all of this element was washed out. The excess Ca that did not wash out of the geothermal filter cake is most likely unconsumed lime used in precipitating manganese and zinc from the brine stream. Correspondingly, Mg was not completely washed out of the geothermal filter cake, and this excess Mg also most likely came from unreacted lime. Manganese was upgraded 1.3-1.4 times, indicating that about 10% of the Mn may have been lost to the wash liquor. For this reason, the chloride-laden wash liquor (filter filtrate) should be recycled to a desired location at the power plant operations 1000 and/or the mineral extraction circuit 2000.

The second sample contained 12.7% Zn and 31.2% Mn. After the sample was repulped for the solid-liquid separation and rheology test program, the values increased to 17.6% Zn and 42.1% Mn. Further bulk washing did not change these values drastically, with the final washed residue assaying at 17.7% Zn and 41.3% Mn.

Example 2

Table 6 provides the parameters for an exemplary design basis per unit operation for washing a manganese-zinc geothermal filter. Tables 7 and 8, respectively, demonstrate the composition of a slurried manganese-zinc geothermal filter cake composition before and after washing.

TABLE 6

| Re-Pulp Wash Circuit | Unit | Value |
|---|---|---|
| Feed Type | — | Re-Pulped Slurry |
| Filter Cake Production Rate | Tons/hr | 10 |
| Slurry Percent Solids (by mass) | % | 18 |
| Slurry specific gravity (SG) | — | 1.25 |
| Liquid SG | — | |
| Solid SG | — | |
| Slurry Temperature | °F | |
| Method of Washing | — | Filter Press |
| Stages | — | 2 |
| Wash Liquor | — | Filtered Canal Water |

TABLE 6-continued

| Re-Pulp Wash Circuit | | |
|---|---|---|
| | Unit | Value |
| Suspended Solids Lost in Filtrate (by mass) | % | 2 |
| Moisture in Filter Cake (by mass) | % | 45 |

TABLE 7

| Composition of Polymetallic Oxide/hydroxide/oxychloride Geothermal Filter Cake | | |
|---|---|---|
| | Unit | Value |
| Ca | g/t | 49,700 |
| Fe | g/t | 6,330 |
| K | g/t | 6,930 |
| Mg | g/t | 8,120 |
| Mn | g/t | 264,000 |
| Na | g/t | 56,800 |
| Pb | g/t | 5,480 |
| Zn | g/t | 108,000 |
| Al | g/t | 1,680 |
| Cl | % | 15 |

TABLE 8

| Composition of slurried manganese-zinc geothermal filter cake composition | | |
|---|---|---|
| | Unit | Value |
| Ca | g/t | 19,000 |
| Fe | g/t | 9,890 |
| K | g/t | 977 |
| Mg | g/t | 9,800 |
| Mn | g/t | 372,000 |
| Na | g/t | 2,820 |
| Pb | g/t | 8,370 |
| Zn | g/t | 166,000 |
| Al | g/t | 2,690 |
| Cl | % | 0.4 |

The slurried manganese-zinc geothermal filter cake composition having a slurry solids by mass of about 30% can be fed directly from the wash circuit 400 to a mineral recovery process and circuit 3000, such as for the selective solvent extraction and crystallization of manganese and zinc. Alternatively, the slurried manganese-zinc geothermal filter cake composition can be dried to a moisture of less than about 5%, and then the dried manganese-zinc geothermal filter cake composition can be sent to a mineral recovery process and circuit 3000, such as for pyrometallurgical recovery of manganese.

Example 3

A study with a series of tests investigated the liquid separation and rheology of the enhanced manganese-zinc geothermal filter cake composition. These tests further defined washing, flocculation, thickening, pressure and vacuum filtration, and various rheological and physical properties of the enhanced manganese-zinc geothermal filter cake composition.

Test 1. Sample Preparation and Characterization

The object of this test was to determine the particle size and density of the enhanced manganese-zinc geothermal filter cake composition. This information is important because finer particles have slower settling and filtration rates, which in turn cause thickener discharges to be more diluted and filter cakes to contain more moisture.

Two moist geothermal filter cakes were obtained in separate containers from an impurity removal pilot plant. The two geothermal filter cakes were combined and re-pulped in tap water to form the test sample. Tap water was used for additional slurry dilution as required for testing. The liquor had a density of 1.059 kg/L after re-pulping the sample to 28 wt. % solids (the "slurried sample").

A particle size analysis was conducted on the slurried sample. The analysis was performed using a Malvern Mastersizer 3000 laser particle sizer fitted with a wet dispersion system. The particle size determination is summarized in Table 9. Subsamples were collected from the slurried sample for solid content analysis in a Halogen Moisture Analyzer HR83 (Mettler-Toledo), as well as in a conventional oven for comparison purposes. The dried sample was submitted for specific gravity ("SG") determination using a Quantachrome Pentapyc 5200*e* gas pycnometer. The SG result is also included in Table 9.

TABLE 9

| Sample Characterization. | | | | | | |
|---|---|---|---|---|---|---|
| | Particle Sizing | | | SG of | | [2]Liquor |
| Sample I.D. | [1]$d_{80}$, μm | [1]<20 μm % vol | [1]<1 μm % vol | Dried Solids | Testing pH | Density, kg/L |
| 2021 Train 2 Res | 18 | 83.6 | 2.8 | 3.62 | 8.0 | 1.059 |

[1]Determined using laser diffraction.

[2]Liquor density was determined after repulping the filter cake in tap water

Test 2. Flocculant Scoping and Static Settling Tests

Flocculant pretreatment generally increases the settling rate of small particles. Flocculent scoping tests were performed on the manganese-zinc geothermal filter using a range of anionic, non-ionic, and cationic flocculants. Flocculant scoping test results indicated that the slurried sample responded well to Magnafloc 333, which is a very high molecular weight, non-ionic polyacrylamide flocculant.

Static settling tests were performed on the slurried sample in two-liter graduated cylinders fitted with a rotating "picket-style" rake. Flocculant was added to the cylinder at a concentration of 0.25 g/L. The required flocculant volume was added in three increments. The graduated cylinder was manually inverted three times after each of the incremental flocculant additions. Static settling test results were used as preliminary starting conditions for subsequent dynamic (continuous) thickening tests. Test results for the optimum static settling test are summarized in Table 10.

TABLE 10

| Preliminary Static Settling Test Results Summary. | | | | | | | |
|---|---|---|---|---|---|---|---|
| Sample I.D. | Dosage, g/t | [1]Feed % w/w | [2]U/F % w/w | Unit Area $m^2/(t/day)$ | [3]ISR $m^3/m^2/day$ | [4]Supernatant Clarity | [5]TSS mg/L |
| 2021 Train 2 Res | 21 | 4 | 35 | 0.29 | 394 | Clear | 36 |

All values were calculated without a safety factor.
Test conditions: 2 L cylinder with rotating picket-style raking, ambient temperature
Flocculant: Magnafloc 333
[1]Diluted Thickener Feed.
[2]Final Thickened "Underflow" Density.
[3]Initial Settling Rate.
[4]Supernatant Visual Clarity at 10 minutes of elapsed settling time.
[5]Supernatant Total Suspended Solids (TSS) at 10 minutes of elapsed settling time.

Test 3. Dynamic Thickening Test

Dynamic thickening tests were performed to determine thickener area requirements (thickener sizing) from batch settling test data. This dynamic thickening testing was conducted on the slurried sample at 4.0% w/w solids (diluted thickener feed density), which was selected based on the results of the static settling tests (Test 2). The effect of flocculant dosage was examined in the first part of the dynamic tests at a constant thickener unit area of 0.35 $m^2/(t/d)$. Adding a dosage of 20 g/t Magnafloc 333 flocculant produced a thickener overflow with a total suspended solid content ("TSS") of 85 mg/L. Increasing the dosage to 25 g/t decreased the TSS to 61 mg/L. Increasing the flocculant dosage to 35 g/t decreased the TSS to 31 mg/L. Results are summarized in Table 11.

Subsequent dynamic thickening tests were conducted at a constant dosage of 25 g/t Magnafloc 333 flocculant over a range of thickener unit areas.

TABLE 11

| Effect of Flocculant Dosage on Overflow Quality (TSS). | | |
|---|---|---|
| Unit Area, $m^2/(t/d)$ | Dosage flocc't, g/t | Overflow TSS, mg/L |
| 0.35 | 20 | 85 |
| 0.35 | 25 | 61 |
| 0.35 | 35 | 31 |
| 0.35 | 40 | 32 |

Diluted thickener feed at 4.0% w/w Solids
Flocculant: BASF Magnafloc 333 at 0.05 g/L
Bed height was maintained around 155 mm Tested thickener unit areas ranged from 0.35 to 0.15 $m^2/(t/d)$ at a constant flocculant dosage of 25 g/t Magnafloc 333. The underflow density was 34.5% w/w solids at 0.35 $m^2/(t/d)$ and decreased to 23.5% w/w solids at 0.15 $m^2/(t/d)$. Overflow TSS increased from 61 mg/L to 290 mg/L as the unit area decreased. Results are summarized in Table 12 below.

A thirty-minute period of extended thickening, without feed or raking, slightly increased the underflow density from 34.5% w/w solids to 36.0% w/w solids when operating at 0.35 $m^2/(t/d)$ unit area. The corresponding yield stress increased from 21 Pa at 34.5% w/w solids to 27 Pa at 36.0% w/w solids after the thirty-minute extended period of thickening. The period of extended thickening was included in the test to observe the change in the thickener bed that may occur during a potential pause or upset in the industrial thickener operation.

TABLE 12

| Summary of Thickening Results by Thickener Unit Area. | | | | | | | |
|---|---|---|---|---|---|---|---|
| Dosage flocc't, g/t | Unit Area, $m^2/(t/d)$ | Solids Loading, $t/m^2/h$ | Net Rise Rate $m^3/m^2/d$ | Underflow, % w/w solids | Overflow TSS, mg/L | Residence Time, h | U/F Yield Stress, Pa |
| 25 | 0.35 | 0.12 | 63.9 | 34.5 | 61 | 0.74 | 21 |
| 25 | 0.30 | 0.14 | 74.5 | 33.4 | 67 | 0.64 | 14 |
| 25 | 0.25 | 0.17 | 89.5 | 31.1 | 122 | 0.53 | 10 |
| 25 | 0.20 | 0.21 | 111.8 | 28.9 | 149 | 0.43 | 9 |
| 25 | 0.15 | 0.28 | 149.1 | 23.5 | 290 | 0.32 | 3 |
| Underflow extended for 30 minutes: | | | | 36.0 | | | 27 |

Bed height was maintained around 150 mm

Test 4. Rheology Sample Characterization

An important aspect relating to sample characterization within a rheology study is the relationship between the solid specific gravity and slurry solid content. Deviation of the actual specific gravity (ASG) versus the specific gravity (SG) of the dry material defines the slurry inter-particle interaction coefficient "α". Table 13 summarizes the rheology sample characterization for the samples at the densities that were tested.

TABLE 13

| Rheology Sample Characterization. | | | | | | | |
|---|---|---|---|---|---|---|---|
| Test Code | $d_{80}$ microns | ASG | SG | α ASG/SG | Temp ° C. | Solids % w/w | Density g/L |
| Sample I.D.: 2021 Train 2 Res Underflow | | | | | | | |
| T1 | 18 | 4.03 | 3.62 | 1.11 | 20.8 | 39.2 | 1478 |
| T2 | | 4.15 | | 1.15 | | 37.1 | 1452 |

TABLE 13-continued

Rheology Sample Characterization.

| Test Code | $d_{80}$ microns | ASG | SG | α ASG/SG | Temp ° C. | Solids % w/w | Density g/L |
|---|---|---|---|---|---|---|---|
| Sample I.D.: 2021 Train 2 Res Underflow | | | | | | | |
| T3 | | 4.04 | | 1.12 | | 35.4 | 1422 |
| T4 | | 4.10 | | 1.13 | | 33.0 | 1391 |
| T5 | | 4.19 | | 1.16 | | 30.4 | 1359 |

Notes:
ASG—Actual specific gravity of dry solids, calculated from the measured pulp density ("Density")
SG—Dried solids specific gravity, measured with the pycnometer
α—Correction Factor, i.e. solids density ratio The washed underflow exhibited moderate interactions as indicated by alpha values around 1.13, meaning that the dry solids specific gravity was lower than the densities in the slurry phase.

Rheology tests were conducted via concentric cylinder rotational viscometry (CCRV) using a Haake RS75 Rheometer with a cylindrical spindle and sample cup configuration. The rheology test measurement data were suitable for Bingham modeling and subsequent interpretation.

The critical solids density (CSD) of the underflow sample was ~36% w/w solids, which exhibited yield stress of 22 Pa under unsheared flow conditions and 13 Pa under sheared conditions (i.e., measured after a three-minute period of constant shearing). The test results are summarized in Table 14. The CSD is the solids content at which a small increase of solids content causes a significant decrease in the flowability of the slurry. The CSD is also predictive of the maximum underflow content achievable in a commercial thickener.

A thixotropic response was exhibited by the sample at test densities equal to or above 33.0% w/w solids. Thixotropic response is a "flow-friendly" behavior whereby the resistance to flow decreases during constant shearing. A plug flow response was exhibited by the sample during the unsheared sample measurement at 39.2% w/w solids. Plug flow is a type of pulp transportation that occurs in pipes or reactors when a thickened pulp moves through a given area without dispersing (laminar flow) or mixing (turbulent flow) within this area.

TABLE 14

CCRV Rheology Data Summary.

| | | Unsheared Sample | | | Sheared Sample | | | |
|---|---|---|---|---|---|---|---|---|
| Test Code | Solids % w/w | γ range, 1/s | $\tau_{yB}$ Pa | $\eta_P$ mPa · s | γ range, 1/s | $\tau_{yB}$ Pa | $\eta_P$ mPa · s | Observations |
| CSD = ~36% solids, corresponding to ~22 Pa unsheared and 13 Pa sheared yield stress. | | | | | | | | |
| T1 | 39.2 | Plug Flow | 92 | — | 200-400 | 24 | 60 | Thixotropic |
| T2 | 37.1 | 300-500 | 44 | 21 | 200-400 | 17 | 42 | Thixotropic |
| T3 | 35.4 | 200-400 | 16 | 27 | 200-400 | 10 | 29 | Thixotropic |
| T4 | 33.0 | 200-400 | 6.8 | 17 | 200-400 | 5.1 | 18 | Thixotropic |
| T5 | 30.4 | 200-400 | 3.1 | 11 | 200-400 | 2.5 | 12 | None |

Notes:
The 2021 Train 2 Res underflow samples contained 25 g/t BASF Magnafloc 333 flocculant.
The values are based on data produced by the unsheared and sheared slurry sample.
Variable shearing was produced in the 0 to 600 $s^{-1}$ range, increasing and decreasing (up and down curves).
Constant shearing was produced by subjecting the slurry sample to a constant rotation at 300 1/s for 180 seconds.
Bingham Plastic parameters: yield stress ($\tau\gamma_B$) and plastic viscosity ($\eta_P$) values, for the specified γ range.
γ—Shear rate range at which the rheological parameters were calculated.

Test 5. Vacuum Filtration Test

Vacuum filtration tests were conducted on the underflow sample at 36% w/w solids based on the results of the dynamic thickening and rheology tests. Vacuum filtration tests were conducted at 20 inches mercury (0.68 bar) of vacuum. Cloth scoping tests were conducted using a range of filter cloths. Testori P4408 TC polypropylene cloth was selected for the vacuum filtration test.

Tested cake thicknesses ranged from 15 mm to 37 mm. The resulting filtered solids throughput (i.e., dry solids capacity) ranged from 116 to 696 kg/$m^2$·h. The discharge cake residual moisture content ranged from 50.9% to 53.6% w/w moisture. Cake surface texture ranged from sticky to dry-to-touch. Vacuum filtration results are summarized in Table 15.

TABLE 15

Summary of Vacuum Filtration Results.

| | Operating Conditions | | | | | Filter Outputs | | | | |
|---|---|---|---|---|---|---|---|---|---|---|
| Filter Cloth | Feed Solids % w/w | Vacuum Level, Inch Hg | Form Time, s | Dry Time, s | Form/Dry Time Ratio | Cake Thickness, mm | [1]Throughput, dry solid $kg/m^2 \cdot h$ | Cake Moisture % w/w | Filtrate TSS, mg/L | Cake Texture |
| Testori P 4408 TC | 36.0 | 20 | 160 | 16 | 9.89 | 37 | 566 | 53.6 | 60 | Sticky |
| | | | 85 | 17 | 5.07 | 25 | 696 | 53.3 | 79 | Sticky |
| | | | 82 | 49 | 1.67 | 25 | 540 | 52.1 | 83 | [2]DTT |
| | | | 85 | 141 | 0.60 | 25 | 316 | 51.1 | 75 | DTT |
| | | | 85 | 425 | 0.20 | 25 | 139 | 51.5 | 69 | DTT |
| | | | 33 | 330 | 0.10 | 15 | 116 | 51.6 | 84 | DTT |
| | | | 159 | 636 | 0.25 | 35 | 126 | 50.9 | 64 | DTT |

[1]Throughputs are calculated using cycle time which includes form and dry times only.
[2]Indicates that the cake surface was dry-to-touch.

Test 6. Pressure Filtration Test

Pressure filtration tests were conducted on the underflow sample at 36% w/w solids. Tests were conducted at 5.5 bar (80 PSI) and 6.9 bar (100 PSI) pressure levels. Scoping tests were conducted using a range of filter cloths. Testori P 4408 TC polypropylene cloth was selected for the test.

Pressure filtration test cake thicknesses ranged from 25 mm to 40 mm. As a brief note, cake thickness in the test equipment was equivalent to half of the filter chamber thickness at full scale. Filtered solids throughput ranged from 812 to 1132 $kg/m^2 \cdot h$ when calculated using the filtration time only; however, when calculated using an estimated full cycle time, the filter throughput was recalculated to a range from 104 to 164 $kg/m^2 \cdot h$. The discharge filter cake residual moisture content ranged from 44.3% to 46.9% w/w. The surface texture of all discharged cakes was dry-to-touch. Cracking and/or wall separation was observed during filtration for all tests. Cracking of the cake is undesirable, as it would potentially short circuit wash liquor and leave unwanted chloride in the cake.

Test 7. Filtration-Washing Test

A cake washing test was conducted on the sample underflow using a vacuum filter as the selected filter type, due to the increased filtered solids throughput that could be achieved via vacuum filtration. Deionized water at room temperature was used as the wash solution. Each wash was added at equal volumes to the formed cake and filtered until most of the wash had passed the surface of the cake. Each wash filtrate was collected individually and submitted for assay. The targeted species for tracking wash efficiency were sodium (Na) and chloride (Cl).

Vacuum filtration-washing was conducted at 20 inches mercury of vacuum on a newly formed 25 mm cake. Na and Cl recoveries were 96.9% and 104.6%, respectively, after 2.0 v/v wash ratio. Further washing only marginally increased recovery. The recovery of Cl was over 100%, suggesting potential solids re-dissolving that may have occurred during washing. Results are summarized in Table 17. It is important to note that chloride recovery reached over 100% after a 1.5:1 volume displacement wash. This

TABLE 16

Pressure Filtration Results Summary.

| | Operating Conditions | | | Filter Outputs | | | | | |
|---|---|---|---|---|---|---|---|---|---|
| | | | | | [2]Filtration Time Cycle | [3]Estimated Full Cycle | | | |
| Filter Cloth | Feed Solids % w/w | Pressure Level bar | Filtration Time s | [1]Cake Thickness mm | Throughput, dry solid $kg/m^2 \cdot h$ | Throughput, dry solid $kg/m^2 \cdot h$ | Cake Moisture % w/w | Filtrate TSS mg/L | Cake Texture |
| Testori P 4408 TC | 36.0 | 5.5 | 81 | 25 | 873 | 104 | 46.8 | 85 | [4]DTT |
| | | | 92 | 30 | 935 | 124 | 46.9 | 78 | DTT |
| | | | 127 | 35 | 812 | 142 | 46.3 | 70 | DTT |
| | | | 143 | 40 | 828 | 160 | 46.5 | 59 | DTT |
| | | 6.9 | 62 | 25 | 1132 | 107 | 46.7 | 83 | DTT |
| | | | 101 | 30 | 849 | 122 | 45.6 | 56 | DTT |
| | | | 112 | 35 | 932 | 146 | 44.7 | 46 | DTT |
| | | | 137 | 40 | 882 | 164 | 44.3 | 51 | DTT |

[1]Cake thickness represents half of the chamber thickness.
[2]Throughput calculated using cycle time which includes filtration time only.
[3]Estimated pressure filter throughput, calculated using a full cycle time which includes filtration time plus 10 minutes of miscellaneous cycle time which includes filter loading, cake discharge, cloth washing, and filter assembly.
[4]Indicates that the cake surface was dry-to-touch.

assumes that the important wash liquor repulping step occurred upstream of vacuum filtration. The estimated full cycle filtration time included filtration time plus any miscellaneous time, which incorporated filter loading, cake discharge, cloth washing, and filter assembly.

TABLE 17

Vacuum Filtration Washing.

| | Wash Ratio | | [3]Time, sec | | Filtrate Tenor, mg/L | | [4]% Recovery | |
|---|---|---|---|---|---|---|---|---|
| Wash No. | [1]V/V | [2]M/M | Form/Wash | Dry | Na | Cl | Na | Cl |
| PLS | 0 | 0 | 90 | 0 | 8330 | 36150 | 36.6% | 36.6% |
| W1 | 0.5 | 0.5 | 144 | 0 | 8440 | 38470 | 65.8% | 67.3% |
| W2 | 1.0 | 1.0 | 143 | 0 | 8150 | 36990 | 93.7% | 96.5% |
| W3 | 1.5 | 1.5 | 164 | 0 | 845 | 7662 | 96.7% | 102.6% |
| W4 | 2.0 | 1.9 | 157 | 0 | 62 | 2525 | 96.9% | 104.6% |
| W5 | 2.5 | 2.4 | 163 | 0 | 15 | 2002 | 96.9% | 106.2% |
| W6 | 3.0 | 2.9 | 163 | 0 | 6.8 | 1735 | 96.9% | 107.5% |
| W7 | 3.5 | 3.4 | 80 | 0 | 4.8 | 1294 | 97.0% | 108.6% |
| W8 | 4.0 | 3.9 | 78 | 0 | 3.0 | 1102 | 97.0% | 109.4% |
| W9 | 4.5 | 4.4 | 84 | 250 | 3.0 | 1081 | 97.0% | 110.3% |

Cake Thickness: 25 mm
Washed Cake Moisture 49% w/w
Cake Dry Weight: 201.32 g
[1]Wash ratio by volume based on cake void volume.
[2]Wash ratio by mass based on cake dry weight.
[3]Incremental form/wash time for each stage.
[4]Recovery percentage calculated based on total feed.

The foregoing test demonstrated that flocculant selection and thickening indicated that the sample responded well to BASF Magnafloc 333 flocculant at a 25 g/t dosage. Rheology tests indicated that the underflow sample displayed a Bingham plastic response and was generally thixotropic. Vacuum filtration achieved higher filtered solids throughput than pressure filtration. Pressure filtration achieved lower residual cake moisture when compared to vacuum filtration. Sodium and chloride recoveries were 96.7% and 102.6%, respectively, after a 1.5 v/v wash ratio. With sodium, potassium, calcium and other alkali and alkali earth metals chloride salts accounted for, chloride recovery reached over 100% after a 1.5 v/v wash ratio, thus indicating potential solids re-dissolving that may have occurred during washing.

Example 4

In this example, a CCD washing process and circuit, as exemplified in FIG. 4, coupled with a downstream solvent extraction circuit to separate zinc from manganese, was analyzed, and the mass and energy balance is depicted in Table 18. This example demonstrates that the enhanced manganese-zinc filter cake composition can be directly sent to a process for separating and beneficiating these constituents.

TABLE 18

CCD Circuit and Process Mass and Energy Balance

| | | STREAM NO. | | | | | | |
|---|---|---|---|---|---|---|---|---|
| | | 1 | 2 | 3 | 4 | 5 | 6 | 7 |
| | PHASE | slurry | Slurry | slurry | slurry | slurry | slurry | slurry |
| Phase Mass | SOLIDS | 6.793 | 6.893 | 0.115 | 6.778 | 6.893 | 0.115 | 6.778 |
| Flowrate | AQUEOUS | 31.21 | 131.0 | 115.1 | 15.81 | 131.0 | 115.1 | 15.81 |
| T/h | ORGANIC | 0.002 | 0.007 | 0.006 | 0.001 | 0.007 | 0.006 | 0.001 |
| | Total wt. % | 38 | 137.9 | 115.3 | 22.59 | 137.9 | 115.3 | 22.59 |
| Percent Solids wt % | Solids | 17.88 | 5.0 | 0.1 | 30 | 5 | 0.1 | 30 |
| Solids Conc. g/L | Solids | 223.2 | 56.85 | 1.100 | 412.8 | 56.85 | 1.100 | 412.8 |
| Specific Gravity | SOLIDS | 3.349 | 3.349 | 3.349 | 3.349 | 3.349 | 3.349 | 3.349 |
| | AQUEOUS | 1.099 | 1.099 | 1.099 | 1.099 | 1.099 | 1.099 | 1.099 |
| | ORGANIC | 0.840 | 0.840 | 0.840 | 0.840 | 0.840 | 0.840 | 0.840 |
| | TOTAL (Slurry) | 1.249 | 1.137 | 1.100 | 1.376 | 1.137 | 1.100 | 1.376 |
| Temperature | °C | 37.4 | 37.4 | 37.4 | 37.4 | 37.4 | 37.4 | 37.4 |
| | °F | 99.30 | 99.27 | 99.27 | 99.27 | 99.23 | 99.23 | 99.23 |
| Enthalpy | kcal/h | 319615 | 1301983 | 1134519 | 167464 | 1299966 | 1132761 | 167204 |
| | BTU/h | 1268336 | 5166687 | 4502134 | 664553 | 5158682 | 4495161 | 663521 |
| | kJ/h | 1337271 | 5447497 | 4746826 | 700671 | 5439057 | 4739474 | 699584 |

TABLE 18-continued

| CCD Circuit and Process Mass and Energy Balance | | | | | | | | |
|---|---|---|---|---|---|---|---|---|
| Solid/Liquid Volumetric Flowrate | $m^3/h$ | 27.61 | 110.0 | 95.11 | 14.89 | 110.0 | 95.11 | 14.89 |
| | USgal/min | 121.5 | 484.3 | 418.7 | 65.57 | 484.3 | 418.7 | 65.57 |
| Gas Volumetric Flowrate | scfm | 0 | 0 | 0 | 0 | 0 | 0 | 0 |
| | acfm | 0 | 0 | 0 | 0 | 0 | 0 | 0 |
| Component Mass Flowrates T/h | 1 $SiO_2$ | 1.447 | 1.468 | 0.025 | 1.444 | 1.468 | 0.025 | 1.444 |
| | 2 $MnSO_4H_2O$ | 0 | 0 | 0 | 0 | 0 | 0 | 0 |
| | 3 ZnO | 1.265 | 1.284 | 0.021 | 1.262 | 1.284 | 0.021 | 1.262 |
| | 4 MnO | 3.300 | 3.348 | 0.056 | 3.292 | 3.348 | 0.056 | 3.292 |
| | 5 $Al_2O_3$ | 0.030 | 0.031 | 0.001 | 0.030 | 0.031 | 0.001 | 0.030 |
| | 6 $Fe_2O_3$ | 0.087 | 0.088 | 0.001 | 0.087 | 0.088 | 0.001 | 0.087 |
| | 7 $H_2O$ | 27.10 | 113.7 | 100.0 | 13.73 | 113.7 | 100.0 | 13.74 |
| | 8 $H_2SO_4$ | 0.240 | 1.006 | 0.884 | 0.121 | 1.005 | 0.884 | 0.121 |
| | 9 aNaOH | 0 | 0 | 0 | 0 | 0 | 0 | 0 |
| | 10 $aZnSO_4$ | 0.000 | 0.000 | 0.000 | 0.000 | 0.000 | 0.000 | 0.000 |
| | 11 $aMnSO_4$ | 0.041 | 0.171 | 0.151 | 0.021 | 0.171 | 0.151 | 0.021 |
| | 12 $aNa_2SO_4$ | 1.068 | 4.480 | 3.939 | 0.541 | 4.480 | 3.939 | 0.541 |
| | 13 RH | 0.000 | 0.001 | 0.001 | 0.000 | 0.001 | 0.001 | 0.000 |
| | 14 NaR | 0.000 | 0.001 | 0.001 | 0.000 | 0.001 | 0.001 | 0.000 |
| | 15 $ZnR_2$ | 0.000 | 0.000 | 0.000 | 0.000 | 0.000 | 0.000 | 0.000 |
| | 16 $MnR_2$ | 0.000 | 0.001 | 0.000 | 0.000 | 0.001 | 0.000 | 0.000 |
| | 17 hEXXSOL | 0.001 | 0.004 | 0.004 | 0.001 | 0.004 | 0.004 | 0.001 |
| | 23 $Zn(OH)_2$ | 0 | 0 | 0 | 0 | 0 | 0 | 0 |
| | 24 $Mn(OH)_2$ | 0 | 0 | 0 | 0 | 0 | 0 | 0 |
| | 25 $aFe_2(SO_4)_3$ | 0 | 0 | 0 | 0 | 0 | 0 | 0 |
| | 26 $aAl_2(SO_4)_3$ | 0.000 | 0.001 | 0.001 | 0.000 | 0.001 | 0.001 | 0.000 |
| | 27 $Al(OH)_3$ | 0 | 0 | 0 | 0 | 0 | 0 | 0 |
| | 28 $Fe(OH)_3$ | 0 | 0 | 0 | 0 | 0 | 0 | 0 |
| | 29 $CaCl_2$ | 0.129 | 0.131 | 0.002 | 0.129 | 0.131 | 0.002 | 0.129 |
| | 30 $aCaCl_2$ | 1.181 | 4.955 | 4.357 | 0.598 | 4.955 | 4.357 | 0.598 |
| | 31 KCl | 0.028 | 0.028 | 0.000 | 0.028 | 0.028 | 0.000 | 0.028 |
| | 32 aKCl | 0.285 | 1.196 | 1.052 | 0.144 | 1.196 | 1.052 | 0.144 |
| | 33 NaCl | 0.110 | 0.112 | 0.002 | 0.110 | 0.112 | 0.002 | 0.110 |
| | 34 aNaCl | 1.289 | 5.409 | 4.756 | 0.653 | 5.408 | 4.755 | 0.653 |
| | 35 $Ca(OH)_2$ | 0.397 | 0.403 | 0.007 | 0.396 | 0.403 | 0.007 | 0.396 |
| Component Assay by Phase - SOLIDS wt % | 1 $SiO_2$ | 21.30 | 21.30 | 21.30 | 21.30 | 21.30 | 21.30 | 21.30 |
| | 2 $MnSO_4H_2O$ | 0 | 0 | 0 | 0 | 0 | 0 | 0 |
| | 3 ZnO | 18.63 | 18.63 | 18.63 | 18.63 | 18.63 | 18.63 | 18.63 |
| | 4 MnO | 48.57 | 48.57 | 48.57 | 48.57 | 48.57 | 48.57 | 48.57 |
| | 5 $Al_2O_3$ | 0.443 | 0.443 | 0.443 | 0.443 | 0.443 | 0.443 | 0.443 |
| | 6 $Fe_2O_3$ | 1.284 | 1.284 | 1.284 | 1.284 | 1.284 | 1.284 | 1.284 |
| | 23 $Zn(OH)_2$ | 0 | 0 | 0 | 0 | 0 | 0 | 0 |
| | 24 $Mn(OH)_2$ | 0 | 0 | 0 | 0 | 0 | 0 | 0 |
| | 27 $Al(OH)_3$ | 0 | 0 | 0 | 0 | 0 | 0 | 0 |
| | 28 $Fe(OH)_3$ | 0 | 0 | 0 | 0 | 0 | 0 | 0 |
| | 29 $CaCl_2$ | 1.898 | 1.898 | 1.898 | 1.898 | 1.898 | 1.898 | 1.898 |
| | 31 KCl | 0.408 | 0.408 | 0.408 | 0.408 | 0.408 | 0.408 | 0.408 |
| | 33 NaCl | 1.621 | 1.621 | 1.621 | 1.621 | 1.621 | 1.621 | 1.621 |
| | 35 $Ca(OH)_2$ | 5.846 | 5.846 | 5.846 | 5.846 | 5.846 | 5.846 | 5.846 |
| Component Assay by Phase - AQUEOUS wt % | 7 $H_2O$ | 86.85 | 86.85 | 86.85 | 86.85 | 86.85 | 86.85 | 86.85 |
| | 8 $H_2SO_4$ | 0.768 | 0.768 | 0.768 | 0.768 | 0.768 | 0.768 | 0.768 |
| | 9 aNaOH | 0 | 0 | 0 | 0 | 0 | 0 | 0 |
| | 10 $aZnSO_4$ | 0.000 | 0.000 | 0.000 | 0.000 | 0.000 | 0.000 | 0.000 |
| | 11 $aMnSO_4$ | 0.131 | 0.131 | 0.131 | 0.131 | 0.131 | 0.131 | 0.131 |
| | 12 $aNa_2SO_4$ | 3.421 | 3.421 | 3.421 | 3.421 | 3.421 | 3.421 | 3.421 |
| | 25 $aFe_2(SO_4)_3$ | 0 | 0 | 0 | 0 | 0 | 0 | 0 |
| | 26 $aAl_2(SO_4)_3$ | 0.001 | 0.001 | 0.001 | 0.001 | 0.001 | 0.001 | 0.001 |
| | 30 $aCaCl_2$ | 3.784 | 3.784 | 3.784 | 3.784 | 3.784 | 3.784 | 3.784 |
| | 32 aKCl | 0.913 | 0.913 | 0.913 | 0.913 | 0.913 | 0.913 | 0.913 |
| | 34 aNaCl | 4.130 | 4.130 | 4.130 | 4.130 | 4.130 | 4.130 | 4.130 |
| Component Assay by Phase - ORGANIC wt % | 13 RH | 14.42 | 14.42 | 14.42 | 14.42 | 14.42 | 14.42 | 14.42 |
| | 14 NaR | 17.34 | 17.34 | 17.34 | 17.34 | 17.35 | 17.35 | 17.35 |
| | 15 $ZnR_2$ | 0.003 | 0.003 | 0.003 | 0.003 | 0.003 | 0.003 | 0.003 |
| | 16 $MnR_2$ | 7.801 | 7.801 | 7.801 | 7.801 | 7.801 | 7.801 | 7.801 |
| | 17 hEXXSOL | 60.43 | 60.43 | 60.43 | 60.43 | 60.43 | 60.43 | 60.43 |
| Component Assay Total Solids wt % | 1 $SiO_2$ | 3.808 | 1.065 | 0.021 | 6.391 | 1.065 | 0.021 | 6.391 |
| | 2 $MnSO_4H_2O$ | 0 | 0 | 0 | 0 | 0 | 0 | 0 |
| | 3 ZnO | 3.330 | 0.931 | 0.019 | 5.588 | 0.931 | 0.019 | 5.588 |
| | 4 MnO | 8.683 | 2.429 | 0.049 | 14.57 | 2.429 | 0.049 | 14.57 |
| | 5 $Al_2O_3$ | 0.079 | 0.022 | 0.000 | 0.133 | 0.022 | 0.000 | 0.133 |
| | 6 $Fe_2O_3$ | 0.229 | 0.064 | 0.001 | 0.385 | 0.064 | 0.001 | 0.385 |
| | 7 $H_2O$ | 71.32 | 82.51 | 86.76 | 60.79 | 82.51 | 86.76 | 60.79 |
| | 8 $H_2SO_4$ | 0.631 | 0.729 | 0.767 | 0.537 | 0.729 | 0.767 | 0.537 |
| | 9 aNaOH | 0 | 0 | 0 | 0 | 0 | 0 | 0 |
| | 10 $aZnSO_4$ | 0.000 | 0.000 | 0.000 | 0.000 | 0.000 | 0.000 | 0.000 |
| | 11 $aMnSO_4$ | 0.108 | 0.124 | 0.131 | 0.092 | 0.124 | 0.131 | 0.092 |
| | 12 $aNa_2SO_4$ | 2.809 | 3.250 | 3.417 | 2.394 | 3.249 | 3.417 | 2.394 |
| | 13 RH | 0.001 | 0.001 | 0.001 | 0.001 | 0.001 | 0.001 | 0.001 |

TABLE 18-continued

| CCD Circuit and Process Mass and Energy Balance | | | | | | | | |
|---|---|---|---|---|---|---|---|---|
| | 14 NaR | 0.001 | 0.001 | 0.001 | 0.001 | 0.001 | 0.001 | 0.001 |
| | 15 $ZnR_2$ | 0.000 | 0.000 | 0.000 | 0.000 | 0.000 | 0.000 | 0.000 |
| | 16 $MnR_2$ | 0.000 | 0.000 | 0.000 | 0.000 | 0.000 | 0.000 | 0.000 |
| | 17 hEXXSOL | 0.003 | 0.003 | 0.003 | 0.002 | 0.003 | 0.003 | 0.002 |
| | 23 $Zn(OH)_2$ | 0 | 0 | 0 | 0 | 0 | 0 | 0 |
| | 24 $Mn(OH)_2$ | 0 | 0 | 0 | 0 | 0 | 0 | 0 |
| | 25 $aFe_2(SO_4)_3$ | 0 | 0 | 0 | 0 | 0 | 0 | 0 |
| | 26 $aAl_2(SO_4)_3$ | 0.001 | 0.001 | 0.001 | 0.001 | 0.001 | 0.001 | 0.001 |
| | 27 $Al(OH)_3$ | 0 | 0 | 0 | 0 | 0 | 0 | 0 |
| | 28 $Fe(OH)_3$ | 0 | 0 | 0 | 0 | 0 | 0 | 0 |
| | 29 $CaCl_2$ | 0.339 | 0.095 | 0.002 | 0.569 | 0.095 | 0.002 | 0.569 |
| | 30 $aCaCl_2$ | 3.107 | 3.594 | 3.780 | 2.648 | 3.594 | 3.780 | 2.648 |
| | 31 KCl | 0.073 | 0.020 | 0.000 | 0.122 | 0.020 | 0.000 | 0.122 |
| | 32 aKCl | 0.750 | 0.868 | 0.912 | 0.639 | 0.868 | 0.912 | 0.639 |
| | 33 NaCl | 0.290 | 0.081 | 0.002 | 0.486 | 0.081 | 0.002 | 0.486 |
| | 34 aNaCl | 3.392 | 3.923 | 4.126 | 2.891 | 3.923 | 4.125 | 2.891 |
| | 35 $Ca(OH)_2$ | 1.045 | 0.292 | 0.006 | 1.754 | 0.292 | 0.006 | 1.754 |
| Component | 7 $H_2O$ | 954.3 | 954.3 | 954.3 | 954.3 | 954.3 | 954.3 | 954.3 |
| Assay Total | 8 $H_2SO_4$ | 8.437 | 8.436 | 8.436 | 8.436 | 8.435 | 8.435 | 8.435 |
| Liquids | 9 aNaOH | 0 | 0 | 0 | 0 | 0 | 0 | 0 |
| g/L | 10 $aZnSO_4$ | 0.000 | 0.000 | 0.000 | 0.000 | 0.000 | 0.000 | 0.000 |
| | 11 $aMnSO_4$ | 1.439 | 1.439 | 1.439 | 1.439 | 1.439 | 1.439 | 1.439 |
| | 12 $aNa_2SO_4$ | 37.59 | 37.59 | 37.59 | 37.59 | 37.58 | 37.58 | 37.58 |
| | 25 $aFe_2(SO_4)_3$ | 0 | 0 | 0 | 0 | 0 | 0 | 0 |
| | 26 $aAl_2(SO_4)_3$ | 0.009 | 0.009 | 0.009 | 0.009 | 0.009 | 0.009 | 0.009 |
| | 30 $aCaCl_2$ | 41.57 | 41.57 | 41.57 | 41.57 | 41.57 | 41.57 | 41.57 |
| | 32 aKCl | 10.04 | 10.04 | 10.04 | 10.04 | 10.04 | 10.04 | 10.04 |
| | 34 aNaCl | 45.38 | 45.38 | 45.38 | 45.38 | 45.37 | 45.37 | 45.37 |
| | 13 RH | 0.009 | 0.009 | 0.009 | 0.009 | 0.009 | 0.009 | 0.009 |
| | 14 NaR | 0.010 | 0.010 | 0.010 | 0.010 | 0.010 | 0.010 | 0.010 |
| | 15 $ZnR_2$ | 0.000 | 0.000 | 0.000 | 0.000 | 0.000 | 0.000 | 0.000 |
| | 16 $MnR_2$ | 0.005 | 0.005 | 0.005 | 0.005 | 0.005 | 0.005 | 0.005 |
| | 17 hEXXSOL | 0.036 | 0.036 | 0.036 | 0.036 | 0.036 | 0.036 | 0.036 |
| Elemental | 1 H 1 | 3.049 | 12.76 | 11.21 | 1.550 | 12.76 | 11.21 | 1.550 |
| Mass Flowrate | 2 C 6 | 0.001 | 0.005 | 0.005 | 0.001 | 0.005 | 0.005 | 0.001 |
| T/h | 4 O 8 | 26.70 | 105.8 | 91.27 | 14.50 | 105.8 | 91.27 | 14.50 |
| | 5 Na 11 | 0.896 | 3.622 | 3.147 | 0.475 | 3.622 | 3.146 | 0.475 |
| | 6 Al 13 | 0.016 | 0.016 | 0.000 | 0.016 | 0.016 | 0.000 | 0.016 |
| | 7 Si 14 | 0.676 | 0.686 | 0.011 | 0.675 | 0.686 | 0.011 | 0.675 |
| | 8 P15 | 0.000 | 0.000 | 0.000 | 0.000 | 0.000 | 0.000 | 0.000 |
| | 9 S16 | 0.328 | 1.377 | 1.210 | 0.166 | 1.377 | 1.210 | 0.166 |
| | 10 Cl 17 | 1.834 | 7.180 | 6.171 | 1.009 | 7.180 | 6.171 | 1.009 |
| | 11 K19 | 0.164 | 0.642 | 0.552 | 0.090 | 0.642 | 0.552 | 0.090 |
| | 12 Ca 20 | 0.688 | 2.055 | 1.578 | 0.477 | 2.055 | 1.578 | 0.477 |
| | 13 Mn 25 | 2.570 | 2.656 | 0.098 | 2.557 | 2.655 | 0.098 | 2.557 |
| | 14 Fe 26 | 0.061 | 0.062 | 0.001 | 0.061 | 0.062 | 0.001 | 0.061 |
| | 15 Zn 30 | 1.017 | 1.031 | 0.017 | 1.014 | 1.031 | 0.017 | 1.014 |
| Elemental | 1 H 1 | 0.159 | 0.159 | 0.159 | 0.159 | 0.159 | 0.159 | 0.159 |
| Assays by | 4 O 8 | 29.08 | 29.08 | 29.08 | 29.08 | 29.08 | 29.08 | 29.08 |
| Phase - | 5 Na 11 | 0.638 | 0.638 | 0.638 | 0.638 | 0.638 | 0.638 | 0.638 |
| SOLIDS | 6 Al 13 | 0.235 | 0.235 | 0.235 | 0.235 | 0.235 | 0.235 | 0.235 |
| wt % | 7 Si 14 | 9.958 | 9.958 | 9.958 | 9.958 | 9.958 | 9.958 | 9.958 |
| | 9 S 16 | 0 | 0 | 0 | 0 | 0 | 0 | 0 |
| | 10 Cl 17 | 2.390 | 2.390 | 2.390 | 2.390 | 2.390 | 2.390 | 2.390 |
| | 11 K19 | 0.214 | 0.214 | 0.214 | 0.214 | 0.214 | 0.214 | 0.214 |
| | 12 Ca 20 | 3.847 | 3.847 | 3.847 | 3.847 | 3.847 | 3.847 | 3.847 |
| | 13 Mn 25 | 37.62 | 37.62 | 37.62 | 37.62 | 37.62 | 37.62 | 37.62 |
| | 14 Fe 26 | 0.898 | 0.898 | 0.898 | 0.898 | 0.898 | 0.898 | 0.898 |
| | 15 Zn 30 | 14.96 | 14.96 | 14.96 | 14.96 | 14.96 | 14.96 | 14.96 |
| Elemental | 1 H 1 | 9.735 | 9.735 | 9.735 | 9.735 | 9.735 | 9.735 | 9.735 |
| Assays by | 4 O 8 | 79.23 | 79.23 | 79.23 | 79.23 | 79.23 | 79.23 | 79.23 |
| Phase - | 5 Na 11 | 2.732 | 2.732 | 2.732 | 2.732 | 2.732 | 2.732 | 2.732 |
| AQUEOUS | 6 Al 13 | 0.000 | 0.000 | 0.000 | 0.000 | 0.000 | 0.000 | 0.000 |
| wt % | 9 S16 | 1.051 | 1.051 | 1.051 | 1.051 | 1.051 | 1.051 | 1.051 |
| | 10 Cl 17 | 5.357 | 5.357 | 5.357 | 5.357 | 5.357 | 5.357 | 5.357 |
| | 11 K19 | 0.479 | 0.479 | 0.479 | 0.479 | 0.479 | 0.479 | 0.479 |
| | 12 Ca 20 | 1.366 | 1.366 | 1.366 | 1.366 | 1.366 | 1.366 | 1.366 |
| | 13 Mn 25 | 0.048 | 0.048 | 0.048 | 0.048 | 0.048 | 0.048 | 0.048 |
| | 14 Fe 26 | 0 | 0 | 0 | 0 | 0 | 0 | 0 |
| | 15 Zn 30 | 0.000 | 0.000 | 0.000 | 0.000 | 0.000 | 0.000 | 0.000 |
| Elemental | 1 H 1 | 14.39 | 14.39 | 14.39 | 14.39 | 14.39 | 14.39 | 14.39 |
| Assays by | 2 C 6 | 75.48 | 75.48 | 75.48 | 75.48 | 75.48 | 75.48 | 75.48 |
| Phase - | 4 O 8 | 4.153 | 4.153 | 4.153 | 4.153 | 4.153 | 4.153 | 4.153 |
| ORGANIC | 5 Na 11 | 1.276 | 1.276 | 1.276 | 1.276 | 1.276 | 1.276 | 1.276 |
| wt % | 8 P15 | 4.020 | 4.020 | 4.020 | 4.020 | 4.020 | 4.020 | 4.020 |
| | 13 Mn 25 | 0.676 | 0.676 | 0.676 | 0.676 | 0.676 | 0.676 | 0.676 |
| | 15 Zn 30 | 0.000 | 0.000 | 0.000 | 0.000 | 0.000 | 0.000 | 0.000 |

TABLE 18-continued

CCD Circuit and Process Mass and Energy Balance

| | | | | | | | | |
|---|---|---|---|---|---|---|---|---|
| Elemental Assays Total wt % | 1 H 1 | 8.023 | 9.256 | 9.725 | 6.862 | 9.256 | 9.725 | 6.862 |
| | 2 C 6 | 0.003 | 0.004 | 0.004 | 0.003 | 0.004 | 0.004 | 0.003 |
| | 4 O 8 | 70.26 | 76.72 | 79.18 | 64.18 | 76.72 | 79.18 | 64.18 |
| | 5 Na 11 | 2.358 | 2.627 | 2.730 | 2.104 | 2.627 | 2.730 | 2.104 |
| | 6 Al 13 | 0.042 | 0.012 | 0.000 | 0.070 | 0.012 | 0.000 | 0.070 |
| | 7 Si 14 | 1.780 | 0.498 | 0.010 | 2.987 | 0.498 | 0.010 | 2.987 |
| | 8 P15 | 0.000 | 0.000 | 0.000 | 0.000 | 0.000 | 0.000 | 0.000 |
| | 9 S16 | 0.863 | 0.999 | 1.050 | 0.736 | 0.999 | 1.050 | 0.736 |
| | 10 Cl 17 | 4.826 | 5.208 | 5.354 | 4.467 | 5.208 | 5.354 | 4.466 |
| | 11 K19 | 0.432 | 0.466 | 0.479 | 0.399 | 0.466 | 0.479 | 0.399 |
| | 12 Ca 20 | 1.810 | 1.490 | 1.369 | 2.111 | 1.490 | 1.369 | 2.111 |
| | 13 Mn 25 | 6.764 | 1.926 | 0.085 | 11.32 | 1.926 | 0.085 | 11.32 |
| | 14 Fe 26 | 0.161 | 0.045 | 0.001 | 0.269 | 0.045 | 0.001 | 0.269 |
| | 15 Zn 30 | 2.675 | 0.748 | 0.015 | 4.489 | 0.748 | 0.015 | 4.489 |
| Elemental Concentration g/L | 1 H 1 | 100.2 | 105.2 | 106.9 | 94.43 | 105.2 | 106.9 | 94.44 |
| | 2 C 6 | 0.042 | 0.044 | 0.045 | 0.039 | 0.044 | 0.045 | 0.039 |
| | 3 N 7 | 0 | 0 | 0 | 0 | 0 | 0 | 0 |
| | 4 O 8 | 877.4 | 872.3 | 870.6 | 883.3 | 872.3 | 870.6 | 883.3 |
| | 5 Na 11 | 29.44 | 29.87 | 30.01 | 28.95 | 29.87 | 30.01 | 28.95 |
| | 6 Al 13 | 0.525 | 0.135 | 0.004 | 0.969 | 0.135 | 0.004 | 0.969 |
| | 7 Si 14 | 22.23 | 5.661 | 0.109 | 41.11 | 5.661 | 0.109 | 41.11 |
| | 8 P15 | 0.002 | 0.002 | 0.002 | 0.002 | 0.002 | 0.002 | 0.002 |
| | 9 S16 | 10.78 | 11.35 | 11.55 | 10.13 | 11.35 | 11.55 | 10.13 |
| | 10 Cl 17 | 60.27 | 59.22 | 58.87 | 61.47 | 59.22 | 58.86 | 61.47 |
| | 11 K19 | 5.390 | 5.296 | 5.264 | 5.497 | 5.295 | 5.264 | 5.497 |
| | 12 Ca 20 | 22.60 | 16.95 | 15.05 | 29.05 | 16.94 | 15.05 | 29.04 |
| | 13 Mn 25 | 84.47 | 21.90 | 0.937 | 155.8 | 21.90 | 0.937 | 155.8 |
| | 14 Fe 26 | 2.004 | 0.510 | 0.010 | 3.707 | 0.510 | 0.010 | 3.707 |
| | 15 Zn 30 | 33.40 | 8.507 | 0.165 | 61.78 | 8.507 | 0.165 | 61.78 |

| | | STREAM NO. | | | | | |
|---|---|---|---|---|---|---|---|
| | | 8 | 9 | 10 | 403 | 318 | 101 |
| | PHASE | slurry | (aqueous) | slurry | slurry | slurry | aqueous |
| Phase Mass Flowrate T/h | SOLIDS | 6.846 | 0.068 | 6.732 | 6.732 | 9.500 | 0 |
| | AQUEOUS | 130.1 | 68.29 | 15.71 | 15.71 | 11.61 | 45.97 |
| | ORGANIC | 0.002 | 0.001 | 0.000 | 0.000 | 0 | 0 |
| | Total wt. % | 136.9 | 68.36 | 22.44 | 22.44 | 21.11 | 45.97 |
| Percent Solids wt % | Solids | 5 | 0.1 | 30 | 30 | 45 | 0 |
| Solids Conc. g/L | Solids | 53.00 | 1.024 | 387.7 | 387.7 | 636.5 | 0.000 |
| Specific Gravity | SOLIDS | 3.349 | 3.349 | 3.349 | 3.349 | 2.884 | 0.000 |
| | AQUEOUS | 1.023 | 1.023 | 1.023 | 1.023 | 0.998 | 0.998 |
| | ORGANIC | 0.840 | 0.840 | 0.840 | 0.840 | 0.000 | 0.000 |
| | TOTAL (Slurry) | 1.060 | 1.024 | 1.292 | 1.292 | 1.414 | 0.998 |
| Temperature | °C | 24.3 | 24.3 | 24.3 | 24.3 | 20.0 | 20.0 |
| | °F | 75.67 | 75.67 | 75.67 | 75.67 | 68.0 | 68.0 |
| Enthalpy | kcal/h | −85489 | −44446 | −11053 | −11053 | −59852 | −208218 |
| | BTU/h | −339246 | −176376 | −43862 | −43862 | −237512 | −826277 |
| | kJ/h | −357685 | −185962 | −46246 | −46246 | −250421 | −871186 |
| Solid/Liquid Volumetric Flowrate | $m^3/h$ | 117.2 | 60.57 | 15.75 | 15.75 | 13.54 | 41.78 |
| | USgal/min | 515.9 | 266.7 | 69.35 | 69.35 | 59.62 | 183.9 |
| Gas Volumetric Flowrate | scfm | 0 | 0 | 0 | 0 | 0 | 0 |
| | acfm | 0 | 0 | 0 | 0 | 0 | 0 |
| Component Mass Flowrates T/h | 1 $SiO_2$ | 1.458 | 0.015 | 1.434 | 1.434 | 1.447 | 0 |
| | 2 $MnSO_4H_2O$ | 0 | 0 | 0 | 0 | 0 | 0 |
| | 3 ZnO | 1.275 | 0.013 | 1.254 | 1.254 | 1.265 | 0 |
| | 4 MnO | 3.325 | 0.033 | 3.270 | 3.270 | 3.300 | 0 |
| | 5 $Al_2O_3$ | 0.030 | 0.000 | 0.030 | 0.030 | 0.030 | 0 |
| | 6 $Fe_2O_3$ | 0.088 | 0.001 | 0.086 | 0.086 | 0.087 | 0 |
| | 7 $H_2O$ | 125.7 | 65.99 | 15.18 | 15.18 | 11.61 | 45.97 |
| | 8 $H_2SO_4$ | 0.256 | 0.134 | 0.031 | 0.031 | 0 | 0 |
| | 9 aNaOH | 0 | 0 | 0 | 0 | 0 | 0 |
| | 10 $aZnSO_4$ | 0.000 | 0.000 | 0.000 | 0.000 | 0 | 0 |
| | 11 $aMnSO_4$ | 0.044 | 0.023 | 0.005 | 0.005 | 0 | 0 |
| | 12 $aNa_2SO_4$ | 1.139 | 0.598 | 0.138 | 0.138 | 0 | 0 |
| | 13 RH | 0.000 | 0.000 | 0.000 | 0.000 | 0 | 0 |
| | 14 NaR | 0.000 | 0.000 | 0.000 | 0.000 | 0 | 0 |
| | 15 $ZnR_2$ | 0.000 | 0.000 | 0.000 | 0.000 | 0 | 0 |
| | 16 $MnR_2$ | 0.000 | 0.000 | 0.000 | 0.000 | 0 | 0 |
| | 17 hEXXSOL | 0.001 | 0.001 | 0.000 | 0.000 | 0 | 0 |
| | 23 $Zn(OH)_2$ | 0 | 0 | 0 | 0 | 0 | 0 |
| | 24 $Mn(OH)_2$ | 0 | 0 | 0 | 0 | 0 | 0 |

TABLE 18-continued

| CCD Circuit and Process Mass and Energy Balance | | | | | | | |
|---|---|---|---|---|---|---|---|
| | 25 $aFe_2(SO_4)_3$ | 0 | 0 | 0 | 0 | 0 | 0 |
| | 26 $aAl_2(SO_4)_3$ | 0.000 | 0.000 | 0.000 | 0.000 | 0 | 0 |
| | 27 $Al(OH)_3$ | 0 | 0 | 0 | 0 | 0 | 0 |
| | 28 $Fe(OH)_3$ | 0 | 0 | 0 | 0 | 0 | 0 |
| | 29 $CaCl_2$ | 0.130 | 0.001 | 0.128 | 0.128 | 1.289 | 0 |
| | 30 $aCaCl_2$ | 1.260 | 0.661 | 0.152 | 0.152 | 0 | 0 |
| | 31 KCl | 0.028 | 0.000 | 0.027 | 0.027 | 0.308 | 0 |
| | 32 aKCl | 0.304 | 0.160 | 0.037 | 0.037 | 0 | 0 |
| | 33 NaCl | 0.111 | 0.001 | 0.109 | 0.109 | 1.377 | 0 |
| | 34 aNaCl | 1.375 | 0.722 | 0.166 | 0.166 | 0 | 0 |
| | 35 $Ca(OH)_2$ | 0.400 | 0.004 | 0.394 | 0.394 | 0.397 | 0 |
| Component Assay by Phase - SOLIDS wt % | 1 $SiO_2$ | 21.30 | 21.30 | 21.30 | 21.30 | 15.23 | 0 |
| | 2 $MnSO_4H_2O$ | 0 | 0 | 0 | 0 | 0 | 0 |
| | 3 ZnO | 18.63 | 18.63 | 18.63 | 18.63 | 13.32 | 0 |
| | 4 MnO | 48.57 | 48.57 | 48.57 | 48.57 | 34.73 | 0 |
| | 5 $Al_2O_3$ | 0.443 | 0.443 | 0.443 | 0.443 | 0.317 | 0 |
| | 6 $Fe_2O_3$ | 1.284 | 1.284 | 1.284 | 1.284 | 0.918 | 0 |
| | 23 $Zn(OH)_2$ | 0 | 0 | 0 | 0 | 0 | 0 |
| | 24 $Mn(OH)_2$ | 0 | 0 | 0 | 0 | 0 | 0 |
| | 27 $Al(OH)_3$ | 0 | 0 | 0 | 0 | 0 | 0 |
| | 28 $Fe(OH)_3$ | 0 | 0 | 0 | 0 | 0 | 0 |
| | 29 $CaCl_2$ | 1.898 | 1.898 | 1.898 | 1.898 | 13.57 | 0 |
| | 31 KCl | 0.408 | 0.408 | 0.408 | 0.408 | 3.240 | 0 |
| | 33 NaCl | 1.621 | 1.621 | 1.621 | 1.621 | 14.49 | 0 |
| | 35 $Ca(OH)_2$ | 5.846 | 5.846 | 5.846 | 5.846 | 4.180 | 0 |
| Component Assay by Phase - AQUEOUS wt % | 7 $H_2O$ | 96.64 | 96.64 | 96.64 | 96.64 | 100 | 100 |
| | 8 $H_2SO_4$ | 0.196 | 0.196 | 0.196 | 0.196 | 0 | 0 |
| | 9 aNaOH | 0 | 0 | 0 | 0 | 0 | 0 |
| | 10 $aZnSO_4$ | 0.000 | 0.000 | 0.000 | 0.000 | 0 | 0 |
| | 11 $aMnSO_4$ | 0.034 | 0.034 | 0.034 | 0.034 | 0 | 0 |
| | 12 $aNa_2SO_4$ | 0.875 | 0.875 | 0.875 | 0.875 | 0 | 0 |
| | 25 $aFe_2(SO_4)_3$ | 0 | 0 | 0 | 0 | 0 | 0 |
| | 26 $aAl_2(SO_4)_3$ | 0.000 | 0.000 | 0.000 | 0.000 | 0 | 0 |
| | 30 $aCaCl_2$ | 0.968 | 0.968 | 0.968 | 0.968 | 0 | 0 |
| | 32 aKCl | 0.234 | 0.234 | 0.234 | 0.234 | 0 | 0 |
| | 34 aNaCl | 1.057 | 1.057 | 1.057 | 1.057 | 0 | 0 |
| Component Assay by Phase - ORGANIC wt % | 13 RH | 14.42 | 14.42 | 14.42 | 14.42 | 0 | 0 |
| | 14 NaR | 17.35 | 17.35 | 17.35 | 17.35 | 0 | 0 |
| | 15 $ZnR_2$ | 0.003 | 0.003 | 0.003 | 0.003 | 0 | 0 |
| | 16 $MnR_2$ | 7.801 | 7.801 | 7.801 | 7.801 | 0 | 0 |
| | 17 hEXXSOL | 60.43 | 60.43 | 60.43 | 60.43 | 0 | 0 |
| Component Assay Total Solids wt % | 1 $SiO_2$ | 1.065 | 0.021 | 6.391 | 6.391 | 6.855 | 0 |
| | 2 $MnSO_4H_2O$ | 0 | 0 | 0 | 0 | 0 | 0 |
| | 3 ZnO | 0.931 | 0.019 | 5.588 | 5.588 | 5.993 | 0 |
| | 4 MnO | 2.429 | 0.049 | 14.57 | 14.57 | 15.63 | 0 |
| | 5 $Al_2O_3$ | 0.022 | 0.000 | 0.133 | 0.133 | 0.143 | 0 |
| | 6 $Fe_2O_3$ | 0.064 | 0.001 | 0.385 | 0.385 | 0.413 | 0 |
| | 7 $H_2O$ | 91.80 | 96.54 | 67.64 | 67.64 | 55 | 100 |
| | 8 $H_2SO_4$ | 0.187 | 0.196 | 0.138 | 0.138 | 0 | 0 |
| | 9 aNaOH | 0 | 0 | 0 | 0 | 0 | 0 |
| | 10 $aZnSO_4$ | 0.000 | 0.000 | 0.000 | 0.000 | 0 | 0 |
| | 11 $aMnSO_4$ | 0.032 | 0.033 | 0.023 | 0.023 | 0 | 0 |
| | 12 $aNa_2SO_4$ | 0.832 | 0.875 | 0.613 | 0.613 | 0 | 0 |
| | 13 RH | 0.000 | 0.000 | 0.000 | 0.000 | 0 | 0 |
| | 14 NaR | 0.000 | 0.000 | 0.000 | 0.000 | 0 | 0 |
| | 15 $ZnR_2$ | 0.000 | 0.000 | 0.000 | 0.000 | 0 | 0 |
| | 16 $MnR_2$ | 0.000 | 0.000 | 0.000 | 0.000 | 0 | 0 |
| | 17 hEXXSOL | 0.001 | 0.001 | 0.001 | 0.001 | 0 | 0 |
| | 23 $Zn(OH)_2$ | 0 | 0 | 0 | 0 | 0 | 0 |
| | 24 $Mn(OH)_2$ | 0 | 0 | 0 | 0 | 0 | 0 |
| | 25 $aFe_2(SO_4)_3$ | 0 | 0 | 0 | 0 | 0 | 0 |
| | 26 $aAl_2(SO_4)_3$ | 0.000 | 0.000 | 0.000 | 0.000 | 0 | 0 |
| | 27 $Al(OH)_3$ | 0 | 0 | 0 | 0 | 0 | 0 |
| | 28 $Fe(OH)_3$ | 0 | 0 | 0 | 0 | 0 | 0 |
| | 29 $CaCl_2$ | 0.095 | 0.002 | 0.569 | 0.569 | 6.107 | 0 |
| | 30 $aCaCl_2$ | 0.920 | 0.967 | 0.678 | 0.678 | 0 | 0 |
| | 31 KCl | 0.020 | 0.000 | 0.122 | 0.122 | 1.458 | 0 |
| | 32 aKCl | 0.222 | 0.234 | 0.164 | 0.164 | 0 | 0 |
| | 33 NaCl | 0.081 | 0.002 | 0.486 | 0.486 | 6.521 | 0 |
| | 34 aNaCl | 1.004 | 1.056 | 0.740 | 0.740 | 0 | 0 |
| | 35 $Ca(OH)_2$ | 0.292 | 0.006 | 1.754 | 1.754 | 1.881 | 0 |
| Component Assay Total Liquids g/L | 7 $H_2O$ | 988.8 | 988.8 | 988.8 | 988.8 | 998.3 | 998.3 |
| | 8 $H_2SO_4$ | 2.011 | 2.011 | 2.011 | 2.011 | 0 | 0 |
| | 9 aNaOH | 0 | 0 | 0 | 0 | 0 | 0 |
| | 10 $aZnSO_4$ | 0.000 | 0.000 | 0.000 | 0.000 | 0 | 0 |
| | 11 $aMnSO_4$ | 0.343 | 0.343 | 0.343 | 0.343 | 0 | 0 |
| | 12 $aNa_2SO_4$ | 8.958 | 8.958 | 8.958 | 8.958 | 0 | 0 |
| | 25 $aFe_2(SO_4)_3$ | 0 | 0 | 0 | 0 | 0 | 0 |

TABLE 18-continued

| CCD Circuit and Process Mass and Energy Balance | | | | | | | |
|---|---|---|---|---|---|---|---|
| | 26 $aAl_2(SO_4)_3$ | 0.002 | 0.002 | 0.002 | 0.002 | 0 | 0 |
| | 30 $aCaCl_2$ | 9.908 | 9.908 | 9.908 | 9.908 | 0 | 0 |
| | 32 aKCl | 2.392 | 2.392 | 2.392 | 2.392 | 0 | 0 |
| | 34 aNaCl | 10.82 | 10.82 | 10.82 | 10.82 | 0 | 0 |
| | 13 RH | 0.002 | 0.002 | 0.002 | 0.002 | 0 | 0 |
| | 14 NaR | 0.002 | 0.002 | 0.002 | 0.002 | 0 | 0 |
| | 15 $ZnR_2$ | 0.000 | 0.000 | 0.000 | 0.000 | 0 | 0 |
| | 16 $MnR_2$ | 0.001 | 0.001 | 0.001 | 0.001 | 0 | 0 |
| | 17 hEXXSOL | 0.009 | 0.009 | 0.009 | 0.009 | 0 | 0 |
| Elemental Mass Flowrate T/h | 1 H 1 | 14.08 | 7.388 | 1.710 | 1.710 | 1.310 | 5.144 |
| | 2 C 6 | 0.001 | 0.001 | 0.000 | 0.000 | 0 | 0 |
| | 4 O 8 | 114.3 | 58.99 | 15.52 | 15.52 | 12.29 | 40.83 |
| | 5 Na 11 | 0.953 | 0.478 | 0.153 | 0.153 | 0.541 | 0 |
| | 6 Al 13 | 0.016 | 0.000 | 0.016 | 0.016 | 0.016 | 0 |
| | 7 Si 14 | 0.682 | 0.007 | 0.670 | 0.670 | 0.676 | 0 |
| | 8 P15 | 0.000 | 0.000 | 0.000 | 0.000 | 0 | 0 |
| | 9 S16 | 0.350 | 0.184 | 0.042 | 0.042 | 0 | 0 |
| | 10 Cl 17 | 1.947 | 0.938 | 0.376 | 0.376 | 1.805 | 0 |
| | 11 K19 | 0.174 | 0.084 | 0.034 | 0.034 | 0.161 | 0 |
| | 12 Ca 20 | 0.718 | 0.241 | 0.314 | 0.314 | 0.680 | 0 |
| | 13 Mn 25 | 2.591 | 0.034 | 2.534 | 2.534 | 2.556 | 0 |
| | 14 Fe 26 | 0.061 | 0.001 | 0.060 | 0.060 | 0.061 | 0 |
| | 15 Zn 30 | 1.024 | 0.010 | 1.007 | 1.007 | 1.017 | 0 |
| Elemental Assays by Phase - SOLIDS wt % | 1 H 1 | 0.159 | 0.159 | 0.159 | 0.159 | 0.114 | 0 |
| | 4 O 8 | 29.08 | 29.08 | 29.08 | 29.08 | 20.80 | 0 |
| | 5 Na 11 | 0.638 | 0.638 | 0.638 | 0.638 | 5.700 | 0 |
| | 6 Al 13 | 0.235 | 0.235 | 0.235 | 0.235 | 0.168 | 0 |
| | 7 Si 14 | 9.958 | 9.958 | 9.958 | 9.958 | 7.120 | 0 |
| | 9 S 16 | 0 | 0 | 0 | 0 | 0 | 0 |
| | 10 Cl 17 | 2.390 | 2.390 | 2.390 | 2.390 | 19.00 | 0 |
| | 11 K19 | 0.214 | 0.214 | 0.214 | 0.214 | 1.699 | 0 |
| | 12 Ca 20 | 3.847 | 3.847 | 3.847 | 3.847 | 7.162 | 0 |
| | 13 Mn 25 | 37.62 | 37.62 | 37.62 | 37.62 | 26.90 | 0 |
| | 14 Fe 26 | 0.898 | 0.898 | 0.898 | 0.898 | 0.642 | 0 |
| | 15 Zn 30 | 14.96 | 14.96 | 14.96 | 14.96 | 10.70 | 0 |
| Elemental Assays by Phase - AQUEOUS wt % | 1 H 1 | 10.82 | 10.82 | 10.82 | 10.82 | 11.19 | 11.19 |
| | 4 O 8 | 86.36 | 86.36 | 86.36 | 86.36 | 88.81 | 88.81 |
| | 5 Na 11 | 0.699 | 0.699 | 0.699 | 0.699 | 0 | 0 |
| | 6 Al 13 | 0.000 | 0.000 | 0.000 | 0.000 | 0 | 0 |
| | 9 S16 | 0.269 | 0.269 | 0.269 | 0.269 | 0 | 0 |
| | 10 Cl 17 | 1.371 | 1.371 | 1.371 | 1.371 | 0 | 0 |
| | 11 K19 | 0.123 | 0.123 | 0.123 | 0.123 | 0 | 0 |
| | 12 Ca 20 | 0.350 | 0.350 | 0.350 | 0.350 | 0 | 0 |
| | 13 Mn 25 | 0.012 | 0.012 | 0.012 | 0.012 | 0 | 0 |
| | 14 Fe 26 | 0 | 0 | 0 | 0 | 0 | 0 |
| | 15 Zn 30 | 0.000 | 0.000 | 0.000 | 0.000 | 0 | 0 |
| Elemental Assays by Phase - ORGANIC wt % | 1 H 1 | 14.39 | 14.39 | 14.39 | 14.39 | 0 | 0 |
| | 2 C 6 | 75.48 | 75.48 | 75.48 | 75.48 | 0 | 0 |
| | 4 O 8 | 4.153 | 4.153 | 4.153 | 4.153 | 0 | 0 |
| | 5 Na 11 | 1.276 | 1.276 | 1.276 | 1.276 | 0 | 0 |
| | 8 P15 | 4.020 | 4.020 | 4.020 | 4.020 | 0 | 0 |
| | 13 Mn 25 | 0.676 | 0.676 | 0.676 | 0.676 | 0 | 0 |
| | 15 Zn 30 | 0.000 | 0.000 | 0.000 | 0.000 | 0 | 0 |
| Elemental Assays Total wt % | 1 H 1 | 10.28 | 10.81 | 7.620 | 7.620 | 6.206 | 11.19 |
| | 2 C 6 | 0.001 | 0.001 | 0.001 | 0.001 | 0 | 0 |
| | 4 O 8 | 83.49 | 86.30 | 69.17 | 69.17 | 58.20 | 88.81 |
| | 5 Na 11 | 0.696 | 0.699 | 0.681 | 0.681 | 2.565 | 0 |
| | 6 Al 13 | 0.012 | 0.000 | 0.070 | 0.070 | 0.075 | 0 |
| | 7 Si 14 | 0.498 | 0.010 | 2.987 | 2.987 | 3.204 | 0 |
| | 8 P15 | 0.000 | 0.000 | 0.000 | 0.000 | 0 | 0 |
| | 9 S16 | 0.256 | 0.269 | 0.188 | 0.188 | 0 | 0 |
| | 10 Cl 17 | 1.422 | 1.372 | 1.677 | 1.677 | 8.550 | 0 |
| | 11 K19 | 0.127 | 0.123 | 0.150 | 0.150 | 0.765 | 0 |
| | 12 Ca 20 | 0.525 | 0.353 | 1.399 | 1.399 | 3.223 | 0 |
| | 13 Mn 25 | 1.893 | 0.050 | 11.29 | 11.29 | 12.11 | 0 |
| | 14 Fe 26 | 0.045 | 0.001 | 0.269 | 0.269 | 0.289 | 0 |
| | 15 Zn 30 | 0.748 | 0.015 | 4.489 | 4.489 | 4.815 | 0 |
| Elemental Concentration g/L | 1 H 1 | 109.0 | 110.7 | 98.49 | 98.49 | 87.77 | 111.7 |
| | 2 C 6 | 0.011 | 0.011 | 0.009 | 0.009 | 0 | 0 |
| | 3 N 7 | 0 | 0 | 0 | 0 | 0 | 0 |
| | 4 O 8 | 885.0 | 883.6 | 894.1 | 894.1 | 823.2 | 886.6 |
| | 5 Na 11 | 7.379 | 7.159 | 8.798 | 8.798 | 36.28 | 0 |
| | 6 Al 13 | 0.125 | 0.003 | 0.910 | 0.910 | 1.067 | 0 |
| | 7 Si 14 | 5.278 | 0.102 | 38.61 | 38.61 | 45.32 | 0 |
| | 8 P15 | 0.001 | 0.001 | 0.001 | 0.001 | 0 | 0 |
| | 9 S16 | 2.709 | 2.752 | 2.434 | 2.434 | 0 | 0 |
| | 10 Cl 17 | 15.07 | 14.05 | 21.67 | 21.67 | 120.9 | 0 |
| | 11 K19 | 1.348 | 1.256 | 1.938 | 1.938 | 10.82 | 0 |

TABLE 18-continued

CCD Circuit and Process Mass and Energy Balance

| | | | | | | |
|---|---|---|---|---|---|---|
| 12 Ca 20 | 5.561 | 3.616 | 18.08 | 18.08 | 45.58 | 0 |
| 13 Mn 25 | 20.06 | 0.510 | 146.0 | 146.0 | 171.2 | 0 |
| 14 Fe 26 | 0.476 | 0.009 | 3.481 | 3.481 | 4.086 | 0 |
| 15 Zn 30 | 7.931 | 0.153 | 58.02 | 58.02 | 68.10 | 0 |

Example 5

In this example, the washed/unwashed ratios were calculated, which is an approximate indicator of what is wash out and what is retained in the enhanced manganese-zinc geothermal filter cake composition.

Table 19 below shows the unwashed geothermal filter cake and enhanced manganese-zinc geothermal filter cake composition and the calculation of unwashed/washed ratios for the various elements. The Zn, Ba, Cu, Pb, Fe, Al, and Si ratios were all between 1.5 and 1.6, indicating very little of these elements were washed out during the CCD process. Si is a key tie element in SSKGRA geothermal filter cakes because it is present as $SiO_2$, insoluble in water, and would not be washed out. The ratio for Li, Na, and K was approximately 0.05, showing that these elements, present in the geothermal filter cake as water-soluble chlorides, were practically all washed out. Mn was upgraded 1.4 times, which indicates some was lost during washing, probably as soluble manganese chloride. A portion of calcium and magnesium was washed out. Both calcium and magnesium are components of the lime used in the initial precipitation of Mn/Zn hydroxides from the brine during impurity removal, and the undissolved portion represents unconsumed, insoluble lime left in the geothermal filter cake.

TABLE 19

Washed/Unwashed

| | Concentration, mg/kg | | | Washed |
|---|---|---|---|---|
| | Unwashed | Washed | Fate | Unwashed |
| Si | 0.66 | 1.00 | insol | 1.51 |
| Li | 226 | 6.0 | soluble | 0.03 |
| Al | 1677 | 2690 | insol | 1.60 |
| Fe | 6420 | 9890 | insol | 1.54 |
| Mg | 8027 | 9800 | soluble | 1.22 |
| Ca | 48833 | 19000 | soluble | 0.39 |
| Na | 56600 | 2820 | soluble | 0.05 |
| K | 16700 | 977 | soluble | 0.06 |
| Ti | 98 | 219 | insol | 2.24 |
| P | <60 | <50 | | 0.83 |
| Mn | 269000 | 372000 | insol | 1.38 |
| Ba | 1077 | 1700 | insol | 1.58 |
| Sr | 562 | 329 | soluble | 0.59 |
| Cu | 121 | 187 | insol | 1.55 |
| Pb | 5407 | 8370 | insol | 1.55 |
| Zn | 107000 | 166000 | insol | 1.55 |
| Cl | 15 | | | |

Tables 20 and 21 show the calculated distribution of the different elements between the wash filtrate (wash liquor) and the wash residue (washed cake). Table 20 used the Si tie as mentioned above. By taking the ratio of washed Si to unwashed Si (1.00/0.663) and multiplying it by (e.g., tying it to) the other washed elemental values, the change in mass was then compared to the parity mass change (Si mass change). A gain in mass of the parity washed value over the unwashed value would indicate that more of that element was retained than was the case with Si, while a decrease in parity washed mass over unwashed mass would indicate that more of that element was lost than was the case with Si. This calculation again confirmed that Al, Cu, Pb, or Zn were not washed out, and that the CCD process washed out practically all the Li, K, and Na and approximately 75% of the Ca. About 10% of the Mn was lost to the wash liquor. This Mn loss is not a problem for two reasons. First, a large quantity of Mn is available in the geothermal filter cake for further processing, and a 10% loss still leaves sufficient Mn. Secondly, the wash liquor will be recycled upstream of the primary Mn/Zn precipitation during impurity removal from the feed brine and will not actually be lost from the circuit.

Table 21 shows an identical calculation using Zn as a tie element. Calculating the tie or parity washed value was accomplished using the same methodology as was used when calculating the Si-tie values, except that the ratio of washed Zn to unwashed Zn was used as the multiplication (tie) factor. The results were very similar when compared to using Si as the tie. The overall result is that the washing process will send considerably fewer troublesome impurities into steps for further processing, including separation of the Mn and Zn, and will enable profitable methods for producing Mn and Zn products.

TABLE 20

Washed/Unwashed based on Si Tie

| | Washed | Si-Parity unwashed | Distribution, % | |
|---|---|---|---|---|
| | Mass, mg | | Residue | Washate |
| Si | 0.663 | 0.663 | 100 | 0 |
| Li | 226 | 4 | 2 | 98 |
| Al | 1677 | 1784 | 106 | −6 |
| Fe | 6420 | 6560 | 102 | −2 |
| Mg | 8027 | 6501 | 81 | 19 |
| Ca | 48833 | 12603 | 26 | 74 |
| Na | 56600 | 1871 | 3 | 97 |
| K | 16700 | 648 | 4 | 96 |
| Ti | 98 | 145 | 149 | −49 |
| Mn | 269000 | 246760 | 92 | 8 |
| Cr | 4 | 7 | 166 | −66 |
| V | 4 | 7 | 166 | −66 |
| Ba | 1077 | 1128 | 105 | −5 |
| Sr | 562 | 218 | 39 | 61 |
| Cu | 121 | 124 | 103 | −3 |
| Pb | 5407 | 5552 | 103 | −3 |
| Zn | 107000 | 110113 | 103 | −3 |

TABLE 21

Washed/Unwashed based on Zn Tie

| | Washed | Zn-Parity unwashed | Distribution, % | |
|---|---|---|---|---|
| | Mass, mg | | Residue | Washate |
| Si | 0.663 | 0.645 | 97 | 3 |
| Li | 226 | 4 | 2 | 98 |

TABLE 21-continued

| Washed/Unwashed based on Zn Tie | | | | |
|---|---|---|---|---|
| | Washed | Zn-Parity unwashed | Distribution, % | |
| | Mass, mg | | Residue | Washate |
| Al | 1677 | 1734 | 103 | −3 |
| Fe | 6420 | 6375 | 99 | 1 |
| Mg | 8027 | 6317 | 79 | 21 |
| Ca | 48833 | 12247 | 25 | 75 |
| Na | 56600 | 1818 | 3 | 97 |
| K | 16700 | 630 | 4 | 96 |
| Ti | 98 | 141 | 144 | −44 |
| Mn | 269000 | 239783 | 89 | 11 |
| Cr | 4 | 6 | 161 | −61 |
| V | 4 | 6 | 161 | −61 |
| Ba | 1077 | 1096 | 102 | −2 |
| Sr | 562 | 212 | 38 | 62 |
| Cu | 121 | 121 | 100 | 0 |
| Pb | 5407 | 5395 | 100 | 0 |
| Zn | 107000 | 107000 | 100 | 0 |

For purposes of the instant disclosure, the term "at least" followed by a number is used herein to denote the start of a range beginning with that number (which may be a range having an upper limit or no upper limit, depending on the variable being defined). For example, "at least 1" means 1 or more than 1. The term "at most" followed by a number is used herein to denote the end of a range ending with that number (which may be a range having 1 or 0 as its lower limit, or a range having no lower limit, depending upon the variable being defined). For example, "at most 4" means 4 or less than 4, and "at most 40%" means 40% or less than 40%.

Terms of approximation (e.g., "about", "substantially", "approximately", etc.) should be interpreted according to their ordinary and customary meanings as used in the associated art unless indicated otherwise. Absent a specific definition and absent ordinary and customary usage in the associated art, such terms should be interpreted to be ±10% of the base value.

When, in this document, a range is given as "(a first number) to (a second number)" or "(a first number)-(a second number)", this means a range whose lower limit is the first number and whose upper limit is the second number. For example, 25 to 100 should be interpreted as a range whose lower limit is 25 and whose upper limit is 100. Additionally, it should be noted that where a range is given, every possible subrange or interval within that range is also specifically intended unless the context indicates the contrary. For example, if the specification indicates a range of 25 to 100, such range is also intended to include subranges such as 26-100, 27-100, etc., 25-99, 25-98, etc., as well as any other possible combination of lower and upper values within the stated range, e.g., 33-47, 60-97, 41-45, 28-96, etc. Note that integer range values have been used in this paragraph for purposes of illustration only, and decimal and fractional values (e.g., 46.7-91.3) should also be understood to be intended as possible subrange endpoints unless specifically excluded.

It should be understood that the exemplary embodiments described above should be considered in a descriptive sense only and not for purposes of limitation. Descriptions of features or aspects within these embodiments should typically be considered as available for other similar features or aspects in other embodiments.

While one or more embodiments have been described with reference to the figures, it will be understood by those of ordinary skill in the art that various changes in form and details may be made therein without departing from the scope of the inventive concept as defined by the following claims.

What is claimed is:

1. A process for producing an enhanced manganese-zinc geothermal filter cake, comprising the steps of:

repulping a polymetallic geothermal filter cake with a repulping liquor to form a slurried geothermal filter cake, the polymetallic geothermal filter cake comprising oxides, hydroxides, oxychlorides, or a combination thereof, the polymetallic geothermal filter cake further comprising an initial concentration of manganese, zinc, and chloride salts; and dewatering the slurried geothermal filter cake to produce an enhanced manganese-zinc geothermal filter cake composition having an enhanced concentration of manganese and zinc and a reduced concentration of chloride salts.

2. The process of claim 1, wherein the polymetallic geothermal filter cake is a Salton Sea or a North Brawley Known Geothermal Resource Area geothermal filter cake.

3. The process of claim 1, wherein the slurried geothermal filter cake has a moisture content of between about 40% and about 95% by weight moisture.

4. The process of claim 1 further comprising a plurality of stages for repulping the polymetallic geothermal filter cake using the repulping liquor to form the slurried geothermal filter cake.

5. The process of claim 1 further comprising washing the slurried geothermal filter cake with a wash liquor.

6. The process of claim 5, wherein the step of washing further comprises one or more stages of displacement washing of the slurried geothermal filter cake with the wash liquor.

7. The process of claim 5, wherein the step of washing further comprises countercurrent decantation washing the slurried geothermal filter cake with the wash liquor.

8. The process of claim 1, wherein the enhanced manganese-zinc geothermal filter cake composition has reduced concentrations of aluminum and iron.

9. The process of claim 5, wherein the wash liquor, the repulping liquor, or both comprise water.

10. The process of claim 9, wherein the wash liquor, the repulping liquor, or both comprise an alkali.

11. The process of claim 10, wherein the alkali is sodium carbonate ($Na_2CO_3$), potassium carbonate ($K_2CO_3$), calcium carbonate ($CaCO_3$), sodium hydroxide (NaOH), potassium hydroxide (KOH), calcium hydroxide ($Ca(OH)_2$), lithium hydroxide (LiOH), ammonium hydroxide ($NH_4OH$), or a mixture or solution thereof.

12. The process of claim 5 further comprising recycling the wash liquor, the repulping liquor, or both.

13. The process of claim 1, wherein the step of dewatering further comprises dewatering the slurried geothermal filter cake to a moisture content between about 10% and about 60% by weight moisture.

14. The process of claim 13, wherein the step of dewatering further comprises dewatering the slurried geothermal filter cake using pressure or vacuum filtration or centrifugation.

15. The process of claim 13 further comprising:

forming and/or processing the enhanced manganese-zinc geothermal filter cake composition; and drying the formed and/or processed, enhanced manganese-zinc geothermal filter cake composition.

16. The process of claim 1 further comprising drying the enhanced manganese-zinc geothermal filter cake composition.

17. The process of claim 1, wherein the enhanced manganese-zinc geothermal filter cake comprises:

more than about 300,000 ppm manganese;

more than about 110,000 ppm zinc; and less than about 150,000 ppm chloride salts.

18. The process of claim 17, wherein the enhanced manganese-zinc geothermal filter cake composition further comprises:

between about 300,000 ppm and about 450,000 ppm manganese; and between about 110,000 ppm and about 200,000 ppm zinc.

19. The process of claim 18, wherein the enhanced manganese-zinc geothermal filter cake composition further comprises:

between about 369,000 ppm and about 421,000 ppm manganese; and between about 149,000 ppm and about 177,000 ppm zinc.

20. The process of claim 17, wherein the enhanced manganese-zinc geothermal filter cake composition comprises less than about 50,000 ppm chloride salts.

21. The process of claim 20, wherein the enhanced manganese-zinc geothermal filter cake composition further comprises less than about 10,000 ppm chloride salts.

22. The process of claim 8, wherein the enhanced manganese-zinc geothermal filter cake composition further comprises:

less than about 10,000 ppm aluminum; and less than about 10,000 ppm iron.

23. The process of claim 17, wherein the enhanced manganese-zinc geothermal filter cake composition is a slurried enhanced manganese-zinc geothermal filter cake composition having a moisture content of between about 40% and about 95% by weight moisture.

24. The process of claim 17, wherein the enhanced manganese-zinc geothermal filter cake composition is a dewatered enhanced manganese-zinc geothermal filter cake composition having a moisture content of between about 10% and about 60% by weight moisture.

25. The process of claim 17, wherein the enhanced manganese-zinc geothermal filter cake composition is a dried enhanced manganese-zinc geothermal filter cake composition having a moisture content of less than about 20% by weight moisture.

26. The process of claim 17, wherein the enhanced manganese-zinc geothermal filter cake composition has a specific gravity of about 3.3 to about 3.6.

27. The process of claim 23, wherein the moisture content of the slurried enhanced manganese-zinc geothermal filter cake composition is between about 45% and about 80% by weight moisture.

28. The process of claim 27, wherein the moisture content of the slurried enhanced manganese-zinc geothermal filter cake composition is between about 50% and about 70% by weight moisture.

29. The process of claim 24, wherein the moisture content of the dewatered enhanced manganese-zinc geothermal filter cake composition is between about 20% and about 45% by weight moisture.

30. The process of claim 29, wherein the moisture content of the dewatered enhanced manganese-zinc geothermal filter cake composition is between about 44% and about 54% by weight moisture.

31. The process of claim 25, wherein the moisture content of the dried enhanced manganese-zinc geothermal filter cake composition is less than about 10% by weight moisture.

32. The process of claim 31, wherein the moisture content of the dried enhanced manganese-zinc geothermal filter cake composition is between about 7% and about 10% by weight moisture.

33. The process of claim 11, wherein the alkali is sodium carbonate.

34. The process of claim 11, wherein the wash liquor, the repulping liquor, or both comprise less than about 100 grams of the alkali per liter of water.

35. The process of claim 34, wherein the wash liquor, the repulping liquor, or both comprise less than about 50 grams of the alkali per liter of water.

* * * * *